United States Patent
Konda et al.

(10) Patent No.: US 11,511,233 B2
(45) Date of Patent: Nov. 29, 2022

(54) SEPARATION MEMBRANE ELEMENT AND OPERATION METHOD THEREFOR

(71) Applicant: TORAY INDUSTRIES, INC., Tokyo (JP)

(72) Inventors: Takeshi Konda, Shiga (JP); Kentarou Takagi, Shiga (JP); Hiroho Hirozawa, Shiga (JP); Hiroyuki Yamada, Shiga (JP); Hiroki Minehara, Shiga (JP); Hiroaki Tanaka, Shiga (JP); Monami Suzuki, Shiga (JP); Yutaro Suzuki, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 538 days.

(21) Appl. No.: 16/335,107

(22) PCT Filed: Sep. 11, 2017

(86) PCT No.: PCT/JP2017/032636
§ 371 (c)(1),
(2) Date: Mar. 20, 2019

(87) PCT Pub. No.: WO2018/056090
PCT Pub. Date: Mar. 29, 2018

(65) Prior Publication Data
US 2019/0282962 A1    Sep. 19, 2019

(30) Foreign Application Priority Data

Sep. 21, 2016  (JP) .............................. JP2016-183742
Oct. 28, 2016  (JP) .............................. JP2016-211467
Oct. 28, 2016  (JP) .............................. JP2016-211468

(51) Int. Cl.
*B01D 63/10* (2006.01)
*B01D 61/02* (2006.01)
(Continued)

(52) U.S. Cl.
CPC ........... *B01D 63/10* (2013.01); *B01D 61/025* (2013.01); *B01D 69/02* (2013.01); *B01D 69/06* (2013.01);
(Continued)

(58) Field of Classification Search
CPC ...... B01D 61/025; B01D 63/10; B01D 69/02; B01D 69/06; B01D 2313/143; B01D 2313/146; B01D 2325/20; C02F 1/441
See application file for complete search history.

(56) References Cited

U.S. PATENT DOCUMENTS

2015/0144550 A1*  5/2015  Okamoto ............... B01D 63/10
                                                              210/497.1
2016/0016122 A1   1/2016  Hayakawa et al.

FOREIGN PATENT DOCUMENTS

CN    104379240 A    2/2015
JP    10-230140 A    9/1998
(Continued)

OTHER PUBLICATIONS

Office Action dated Dec. 31, 2020, in Chinese Patent Application No. 201780057759.5.
(Continued)

*Primary Examiner* — Patrick Orme
(74) *Attorney, Agent, or Firm* — Birch, Stewart, Kolasch & Birch, LLP

(57) ABSTRACT

According to the present invention, it is possible to obtain a separation membrane element which has an element configuration having high fresh water production performance and high removal performance, has an improved membrane surface linear velocity whereby fouling due to hardly-soluble salts (scales) or organic matters is less likely to occur on the membrane surface particularly in high recovery ratio
(Continued)

operation, and is excellent in fresh water production performance and removal performance over a long period of time.

8 Claims, 4 Drawing Sheets

(51) Int. Cl.
  *B01D 69/02*  (2006.01)
  *C02F 1/44*  (2006.01)
  *B01D 69/06*  (2006.01)

(52) U.S. Cl.
  CPC ........ *C02F 1/441* (2013.01); *B01D 2313/146* (2013.01); *B01D 2325/20* (2013.01)

(56) References Cited

FOREIGN PATENT DOCUMENTS

| | | |
|---|---|---|
| JP | 2001-62255 A | 3/2001 |
| JP | 2010-125418 A | 6/2010 |
| JP | 2014-100645 A | 6/2014 |
| JP | 2014-159015 A | 9/2014 |
| WO | WO 2015/016253 A1 | 2/2016 |

OTHER PUBLICATIONS

Office Action dated Feb. 25, 2021, in Indian Patent Application No. 201947010880.
Office Action dated May 25, 2021, in Japanese Patent Application No. 2017-550775.
International Search Report, issued in PCT/JP2017/032636, PCT/ISA/210, dated Nov. 28, 2017.
Written Opinion of the International Searching Authority, issued in PCT/JP2017/032636, PCT/ISA/237, dated Nov. 28, 2017.
Office Action dated Jul. 19, 2021, in Chinese Application No. 201780057759.5.
Office Action dated Aug. 11, 2021, in Republic of Korea Patent Application No. 10-2019-7008027.

* cited by examiner

SEPARATION MEMBRANE ELEMENT AND OPERATION METHOD THEREFOR

TECHNICAL FIELD

The present invention relates to a separation membrane element for use in separation of ingredients contained in fluids such as liquid and gas.

BACKGROUND ART

In the recent technique for removal of ionic substances contained in seawater, brackish water or the like, separation methods utilizing separation membrane elements have found increasing uses as processes for energy savings and conservation of resources. Separation membranes adopted in the separation methods utilizing separation membrane elements are classified into five groups according to their pore sizes and separation function, namely microfiltration membranes, ultrafiltration membranes, nanofiltration membranes, reverse osmosis membranes and forward osmosis membranes. These membranes have been used, for example, in production of drinkable water from seawater, brackish water, water containing deleterious substances, or the like, production of ultrapure water for industrial uses, effluent treatment, recovery of valuable substances, or the like, and have been used properly according to ingredients targeted for separation and separation performance requirements.

Separation membrane elements have various shapes, but they are common in that they feed the feed water to one surface of a separation membrane and obtain permeate from the other surface thereof when the target for separation is water. By having a plurality of separation membranes tied in a bundle, each separation membrane element is configured to extend the membrane area per separation membrane element, in other words, to increase the amount of the permeate obtained per separation membrane element. Various types of shapes, such as a spiral type, a hollow fiber type, a plate-and-frame type, a rotating flat-membrane type and a flat-membrane integration type, have been proposed for separation membrane elements, according to their uses and purposes.

For example, spiral-type separation membrane elements have been widely used in reverse osmosis filtration. The spiral-type separation membrane element includes a water collection tube and a stack wound up around the water collection tube. The stack is formed by stacking a feed-side channel material for feeding feed water to a surface of a separation membrane, a separation membrane for separating ingredients contained in the feed water and a permeate-side channel material for leading into the water collection tube permeate having been separated from the feed water by passing through the separation membrane. In the spiral-type separation membrane element, it is possible to apply pressure to the feed water, and therefore, it has been preferably used in that a larger amount of the permeate can be taken out.

In order to improve the performance of the spiral-type separation membrane element, it is required that the spiral-type separation membrane element have high fresh water production, high removal performance and a long service life. In recent years, as methods for achieving high fresh water production of the spiral-type separation membrane element, a method has been proposed in which the thickness of members such as a feed-side channel material, a separation membrane and a permeate-side channel material are reduced and the amount of the separation membrane to be filled in the spiral-type separation membrane element is increased to increase the fresh water production rate. Particularly, a method of thinning the feed-side channel material and increasing the separation membrane amount has been adopted since the feed-side channel material is thick among the members and the flow resistance thereof generated is small when the spiral-type separation membrane element is operated, and even if the feed-side channel material is further thinned, the increase in flow resistance is slight.

Specifically, Patent Document 1 proposes a spiral-type separation membrane element in which a feed-side channel material having a thickness of 0.08 min to 2 mm is incorporated and a channel material having low resistance are disposed on a permeate-side.

In order to improve the removal performance of the spiral-type separation membrane element, a channel material member and a spiral-type separation membrane element structure are proposed which can enhance the turbulent effect on the membrane surface and prevent the concentration polarization.

Specifically, Patent Document 2 proposes a spiral-type separation membrane element having an increased turbulent effect on the membrane surface by providing protruding portions and grooves on a feed-side surface of the separation membrane.

BACKGROUND ART DOCUMENT

Patent Document

Patent Document 1: JP-A-10-230140
Patent Document 2: JP-A-2010-125418

SUMMARY OF THE INVENTION

Problems that the Invention is to Solve

Despite the various proposals described above, the separation membrane element is not sufficient from the viewpoint of fresh water production performance and removal performance, and there is also room for improvement in terms of maintaining the performance of the separation membrane element over a long period of time.

Therefore, an object of the present invention is to provide a separation membrane element excellent in fresh water production performance and removal performance over a long period of time.

Means for Solving the Problems

In order to attain the object described above, the present invention has the following configurations (1) to (10).
(1) A separation membrane element including:
   a water collection tube;
   a separation membrane having a feed-side face and a permeate-side face;
   a feed-side channel material; and
   a permeate-side channel material,
   in which the separation membrane, the feed-side channel material and the permeate-side channel material are spirally wound around the water collection tube,
   the feed-side channel material comprises a plurality of fibrous materials crossing each other,
   the feed-side channel material has a thickness of 0.15 mm to 0.50 mm, and
   in a case where an aqueous sodium chloride solution having a concentration of 200 ppm and a pH of 6.5 is used as feed water, and filtration is performed under conditions of an operation pressure of 0.41 MPa and a temperature of 25° C., the separation membrane has a value of $A^3/B$ (m$^2$/sec$^2$/MPa$^3$) of $8.0 \times 10^{-8}$ or more, in which A (m/sec/MPa) is a solution permeation coefficient and B (m/sec) is a solute permeation coefficient.

(2) The separation membrane element according to (1), in which, in a case where an aqueous sodium chloride solution having a concentration of 200 ppm and a pH of 6.5 is used as feed water, and filtration is performed under conditions of an operation pressure of 0.41 MPa and a temperature of 25° C., a permeate amount is 1.5 m$^3$/m$^2$/day or more.

(3) The separation membrane element according to (1) or (2), in which the feed-side channel material has an intersection density of 3 or less per 100 mm$^2$.

(4) The separation membrane element according to (1) or (2), in which the feed-side channel material has an intersection density of 15 to 210 per 100 mm$^2$.

(5) The separation membrane element according to any one of (1) to (4), in which a feed-side flow channel formed by the feed-side channel material is formed in a direction perpendicular to a longitudinal direction of the water collection tube.

(6) The separation membrane element according to any one of (1) to (5), in which the permeate-side channel material is a sheet on which a plurality of projections are formed or a sheet on which a plurality of projections are fixed.

(7) The separation membrane element according to (6), in which the projections are continuous in the direction perpendicular to the longitudinal direction of the water collection tube.

(8) The separation membrane element according to any one of (1) to (7), in which a cross section of the permeate-side channel material forms a plurality of permeate-side flow channels, and a cross-sectional area ratio of the permeate-side channel material is 0.4 to 0.75.

(9) A method for operating a separation membrane element, the method including: producing fresh water in an amount of 60% or more based on an amount of water fed, using the separation membrane element according to any one of (1) to (8).

(10) A method for operating a separation membrane element, the method including: producing fresh water in an amount of 40% or less based on an amount of water fed, using the separation membrane element according to any one of (1) to (8).

Advantage of the Invention

According to the present invention, it is possible to obtain a separation membrane element which has an element configuration having high fresh water production performance and high removal performance, has an improved membrane surface linear velocity whereby fouling due to hardly-soluble salts (scales) or organic matters is less likely to occur on the membrane surface particularly in high recovery ratio operation, and is excellent in fresh water production performance and removal performance over a long period of time.

MODE FOR CARRYING OUT THE INVENTION

Hereinafter, embodiments of the separation membrane element according to the present invention are described in detail.

<Outline of Separation Membrane Element>

Figure 1:
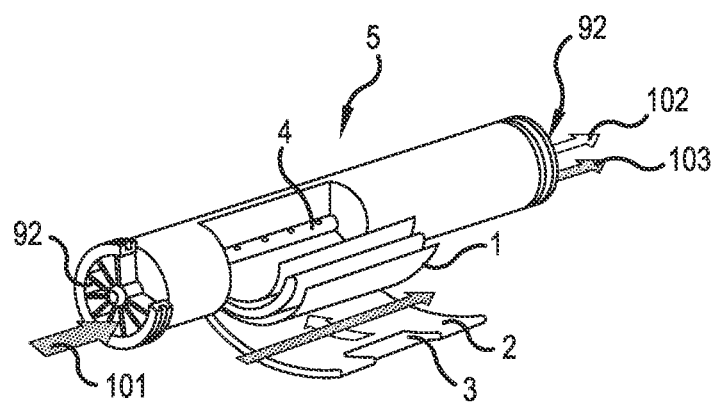
FIG. 1 is a schematic diagram illustrating an example of a separation membrane element according to the present invention.

In the separation membrane element, a net made of a polymer is mainly used as a feed-side channel material in order to form a flow channel for feed-side water. In addition, for example, a multilayer-type separation membrane is used as the separation membrane. The multilayer-type separation membrane includes a separation functional layer including a cross-linked polymer such as polyamide, a porous resin layer (porous supporting layer) including a polymer such as polysulfone, and a substrate such as a nonwoven fabric including a polymer such as polyethylene terephthalate, which are stacked from a feed side to a permeate side in this order. Further, in order to form a flow channel for permeate-side water, a permeate-side channel material is used. As illustrated in FIG. 1, a feed-side channel material 1 is sandwiched by separation membranes 2, a permeate-side channel material 3 is stacked to form one unit, followed by being spirally would around a water collection tube 4 to form a separation membrane element 5.

The separation membrane element 5 includes end plates 92 with holes at a first end and a second end thereof. That is, feed water 101 fed from the first end of the separation membrane element 5 is separated into permeate 102 and concentrate 103 by the separation membrane. The permeate 102 passes through the water collection tube 4 and is taken out from the second end of the separation membrane element 5. The concentrate 103 flows out from the separation membrane element 5 through the holes of the end plate 92 with holes at the second end.

Figure 2:
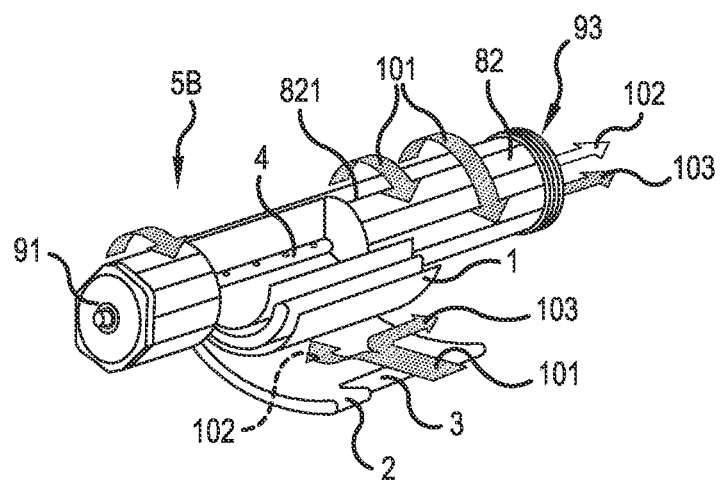
FIG. 2 is another schematic diagram illustrating an example of the separation membrane element according to the present invention.

In the present invention, as illustrated in FIG. 2, it is possible to adopt a configuration of a separation membrane element 5B in which the flow of the feed water is different. In the general separation membrane element 5, a feed-side flow channel formed by the feed-side channel material is provided in a direction parallel to a longitudinal direction of the water collection tube 4, whereas in the separation membrane element 5B, the feed-side flow channel is provided at least in a direction perpendicular to the longitudinal direction of the water collection tube 4.

The method for preparing the separation membrane element 5B is as follows. Specifically, the feed-side channel material 1 is sandwiched by the separation membranes 2, the permeate-side channel material 3 is stacked to form one unit, followed by being spirally would around the water collection tube 4. Thereafter, edge cutting is performed at both ends, a sealing plate (corresponding to a first end plate 91) for preventing inflow of the feed water from one end is attached, and an end plate corresponding to a second end plate 93 is attached to the other end of the covered wound body, so as to obtain the separation membrane element.

As a porous member 82, a member having a plurality of pores through which the feed water can pass is used. The pores 821 provided in the porous member 82 may also be said as a feed port of the feed water. The material, size, thickness and rigidity and the like of the porous member 82 are not particularly limited, as long as the porous member has a plurality of pores. The membrane area per unit volume of the separation membrane element can be increased by employing a member having a relatively small thickness as the porous member 82.

Although the pores 821 provided in the porous member 82 are illustrated in slit shapes (linear shapes) FIG. 2, a structure in which a plurality of pores having shapes such as a circle, a quadrangle, an ellipse and a triangle are arranged may be used.

The thickness of the porous member 82 is, for example, preferably 1 mm or less, more preferably 0.5 mm or less, and still more preferably 0.2 mm or less. Additionally, the porous member 82 may be a member having flexibility or elasticity, which can be deformed along a periphery shape of the wound body. More specifically, a net, a porous film and the like are applicable as the porous member 82. The net and the porous film may each be formed into a tube shape so that the wound body can be contained in the inside thereof, or may each be in an elongated shape and wound around the wound body.

The porous member 82 is arranged on the outer periphery of the separation membrane element 5B. By arranging the porous member 82 in this way, the pores are provided on the outer periphery of the separation membrane element 5B. Particularly, the "outer periphery" may also be said as a portion of the whole outer periphery of the separation membrane element 5B, except for the above-mentioned first end face and second end face. In this embodiment, the porous member 82 is arranged so as to cover almost entirely the outer periphery of the wound body.

When the separation membrane element 5B is loaded in a vessel and operated, since the end plate of the first end is the end plate 91 without holes, the feed water does not flow into the separation membrane element 5B from the first end face. The feed water 101 flows into a gap between the vessel and the separation membrane element 5B. Then, the feed water 101 is fed to the separation membrane 2 from the outer periphery of the separation membrane element 5B via the porous member 82 in a direction perpendicular to the longitudinal direction of the water collection tube. Accordingly, the feed water 101 thus fed is separated into the permeate 102 and the concentrate 103 by the separation membrane. The permeate 102 passes through the water collection tube 6 and is taken out from the second end of the separation membrane element 5B. The concentrate 103 flows out from the separation membrane element 5B through the holes of the end plate 93 with holes at the second end.

As the separation membrane element 5B, when the separation membrane element, in which the feed-side flow channel formed by the above-described feed-side channel material is provided at least in the direction perpendicular to the longitudinal direction of the water collection tube, is prepared using a separation membrane pair having a longer side length in the direction perpendicular to the longitudinal direction of the water collection tube than the width of the separation membrane element, the inflow cross-sectional area of the feed water is narrower and the linear velocity of the feed water passing through the separation membrane element increases as compared with the conventional spiral-type separation membrane element in which the feed-side flow channel is provided in the direction parallel to the longitudinal direction of the water collection tube. Therefore, the separation membrane element 5B according to the present invention is advantageous in that the concentration polarization phenomena can be prevented when performing a high recovery ratio operation in which the salt concentration on the membrane surface of the separation membrane increases.

Figure 3:
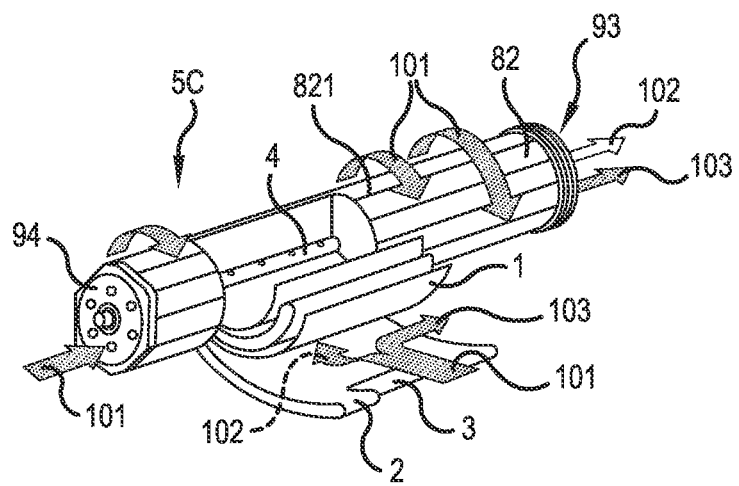
FIG. 3 is yet another schematic diagram illustrating an example of the separation membrane element according to the present invention.

In the present invention, as illustrated in FIG. 3, it is also possible to adopt a configuration of a separation membrane element 5C in which the flow of the feed water is different. In the separation membrane element 5C, the end plate 91 without holes at the first end of the separation membrane element 5B is changed to an end plate 94 with holes, and thus the feed water 101 can flow from both the outer periphery and the first end of the separation membrane element 59.

Further, as for the arrangement of the holes of the end plate 93 with holes, when the opening is too large, the feed water may not uniformly flow into the feed-side flow channel and a short-pass may occur, Thus, the end plate 93 with holes can be provided around the water collection tube so that the effect of the present invention is exhibited. The separation membrane element 5C can be prepared in the same procedure as the separation membrane element 5B except that the end plate 91 without holes is changed to the end plate 94 with holes.

Similar to the separation membrane element 5B, in the separation membrane element 5C, since the feed-side flow channel formed by the feed-side channel material is provided in the direction perpendicular to the longitudinal direction of the water collection tube, it is possible to adopt a configuration suitable for a high recovery ratio operation as compared with the conventional separation membrane element.

<Separation Membrane>
(Outline)

As the separation membrane 2, a membrane having separation performance according to its usage, its purpose and the like is used. The separation membrane 2 may be formed by a single layer, or it may be a multilayer-type composite membrane including a separation functional layer and a substrate. In the composite membrane, there may be a porous supporting layer between the separation functional layer and the substrate.

Here, a surface having the separation functional layer is referred to as a feed-side face, the surface opposite to the surface having the separation functional layer is referred to as a permeate-side face, and the separation membrane in a state where the feed-side faces are formed to face each other is referred to as a separation membrane pair.

(Separation Functional Layer)

The separation functional layer may be a layer having both a separation function and a support function, or it may be a layer having a separation function alone. The term "separation functional layer" refers to a layer having at least a separation function.

When the separation functional layer has both a separation function and a support function, a layer containing a polymer selected from the group consisting of cellulose, polyvinylidene fluoride, polyether sulfone and polysulfone as a main component is preferably applied to the separation functional layer.

On the other hand, as the component for the separation functional layer, a crosslinked polymer is preferably used in terms of easy pore size control and excellent durability. Particularly, in terms of excellent performance for separating ingredients in the feed water, a polyamide separation functional layer obtained by polycondensation of a polyfunctional amine and a polyfunctional acid halide, an organic-inorganic hybrid functional layer or the like is favorably used. These separation functional layers can be formed by polycondensation of monomers on the porous supporting layer For example, a separation functional layer containing a polyamide as a main component may be formed by interfacial polycondensation of a polyfunctional amine and a polyfunctional acid halide according to a known method. More specifically, an aqueous solution of the polyfunctional amine is applied onto the porous supporting layer, the excessive aqueous polyfunctional amine solution is removed with an air knife, and thereafter an organic solvent solution containing the polyfunctional acid halide is applied thereon to initiate polycondensation, so as to form the polyamide separation functional layer.

When the interfacial polycondensation is performed in the presence of an aliphatic carboxylic acid including a linear or branched alkyl group and having 5 or more carbon atoms, the distribution of terminal functional groups can be precisely controlled and both water permeability and removal performance can be achieved. Such an aliphatic carboxylic acid can be added to an aqueous solution of the polyfunctional amine or an organic solvent solution that is immiscible with water and contains the polyfunctional acid halide, or can be impregnated in advance into the porous supporting membrane.

Examples of such an aliphatic carboxylic acid include: linear saturated alkyl carboxylic acids such as a caproic acid, a heptanoic acid, a caprylic acid, a pelargonic acid, a nonanoic acid, decanoic acid, an undecanoic acid, a dodecanoic acid or a tridecanoic acid; branched saturated alkyl carboxylic acid such as a caprylic acid, an isobutyric acid, an isopentanoic acid, a butylacetic acid, a 2-ethylheptanoic acid or a 3-methylnonanoic acid; and unsaturated alkyl carboxylic acids such as a methacrylic acid, a trans-3-hexenoic acid, a cis-2-octenoic acid or a trans-4-nonenoic acid.

The total carbon number of these aliphatic carboxylic acids is preferably in the range of 5 to 20, and more preferably in the range of 8 to 15. When the total carbon number is less than 5, the effect of improving the water permeability of the separation functional membrane tends to be small; when the total carbon number is more than 20, the boiling point becomes high and it is difficult to remove the aliphatic carboxylic acid from the membrane, making it difficult to exhibit high water permeability.

Further, when these aliphatic carboxylic acids are added to the water-immiscible organic solvent solution containing the polyfunctional acid halide, the HLB value is set to 4 to 12, so that improvement of water permeability of the membrane and improvement of contamination resistance of the membrane are simultaneously exhibited, and furthermore, removability of the aliphatic carboxylic acid from the porous supporting membrane is facilitated, which is preferable.

Here, the HLB value is a value representing the degree of affinity to an organic solvent immiscible with water. Several methods for determining the HILB value by calculation have been proposed. According to the Griffin's method, the HLB value is defined by the following formula.

$$\text{HLB value} = 20 \times \text{HLB value of hydrophilic part} = 20 \times (\text{total of formula weight of hydrophilic part})/(\text{molecular weight})$$

The concentration of the aliphatic carboxylic acid in the organic solvent solution can be appropriately determined depending on the aliphatic carboxylic acid to be added. Specifically, the concentration thereof is preferably in the range of 0.03 mass % to 30 mass %, and more preferably in the range of 0.06 mass % to 10 mass %.

(Porous Supporting Layer)

The porous supporting layer is a layer which supports the separation functional layer, and can also be restated as a porous resin layer when the material thereof is a resin.

The material used in the porous supporting layer and the shape thereof are not particularly limited. For example, the porous supporting layer may be formed with a porous resin on the substrate. As the porous supporting layer, polysulfone, cellulose acetate, polyvinyl chloride, epoxy resin, or a mixture or a laminate thereof is used. Among them, it is preferred to use polysulfone having high chemical, mechanical and thermal stability and easily controllable in pore size.

The porous supporting layer can be formed, for example, by casting a N,N-dimethylformamide (DMF) solution of polysulfone in a constant thickness onto a substrate described later, such as a densely woven polyester nonwoven fabric, and subjecting it to wet coagulation in water.

The porous supporting layer can be formed in accordance with the method described in "Office of Saline Water Research and Development Progress Report", No. 359 (1968). In order to obtain a desired configuration, the polymer concentration, the solvent temperature and the poor solvent are adjustable.

(Substrate)

The separation membrane may have the substrate from the viewpoints of the strength and dimensional stability of the separation membrane. As the substrate, a fibrous substrate is preferably used in terms of strength and fluid permeability.

As the substrate, a long-fiber nonwoven fabric and a short-fiber nonwoven fabric can be preferably used.

(Separation Membrane Performance)

The separation membrane to be filled in the separation membrane element according to the present invention has a value of $A^3/B$ ($m^2/sec^2/MPa^3$) of $8.0 \times 10^{-8}$ or more, when a pure water permeation coefficient is denoted as A (m/sec/MPa) and a solute permeation coefficient is denoted as B (m/sec) in a case where the separation membrane is cut out in 47 cm$^2$, an aqueous sodium chloride solution having a concentration of 200 ppm and a pH of 6.5 is used as feed water, operation is performed under conditions of an operation pressure of 0.41 MPa, a temperature of 25° C. and a recovery ratio of 0.1% or less for 15 minutes, and then sampling is performed for 1 minute. This indicates that the separation membrane has high performance (high permeability and high removal performance). As the performance of the separation membrane improves, the feed water amount and membrane surface salt concentration increases, and the flow resistance of the flow channel and fouling risk on the membrane surface increase accordingly. However, in the separation membrane element according to the present invention, it is possible to stably exhibit higher performance than the conventional separation membrane element even when a high performance separation membrane is mounted.

<Feed-Side Channel Material>

(Outline)

The separation membrane element includes a feed-side channel material arranged so as to face the feed-side face of the separation membrane. The feed-side channel material may be formed so as to form a flow channel for feeding the feed water to the separation membrane 2. In order to prevent the concentration polarization of the feed water, it is preferable to provide the feed-side channel material so as to disturb the flow of the feed water.

As the feed-side channel material, a member having a continuous shape such as a knitted fabric, a woven fabric, and a net is used. Among them, a net is preferably used in terms of securing a flow channel for the teed water and preventing concentration polarization. The net in the present application is a structure having a mesh shape in which a plurality of fibrous materials (constituent fibers) crossing each other are thermally fused, and is formed by adhering resins of the fibrous materials in the longitudinal direction and in the transverse direction respectively discharged from holes provided in the extrusion die in a molten state and then solidifying by cooling.

Figure 4:
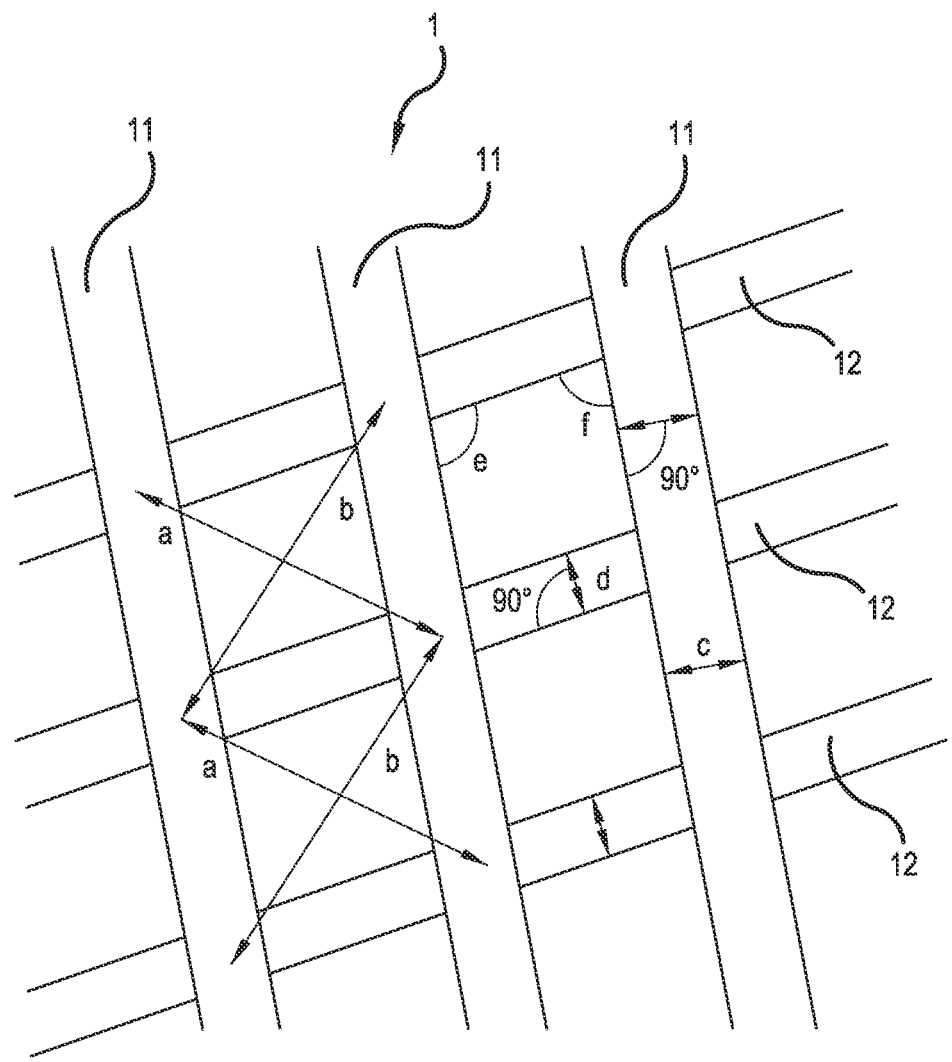
FIG. 4 illustrates an example of a plan view of a feed-side channel material applied to the present invention.

As illustrated in FIG. 4, the teed-side channel material includes a fibrous column A including a plurality of fibrous materials A 11 aligned in one direction and a fibrous column B including a plurality of fibrous materials B 12 aligned in a direction different from the fibrous column A. The fibrous materials A intersect with the fibrous materials B at a plurality of points.

(Tilt Angie of Fibrous Material)

As illustrated in FIG. 4, as the tilt angle e or f of the fibrous material (constituent fiber) of the feed-side channel material is closer to 0° or 180°, the feed water flow channel to the membrane surface becomes narrower, Therefore, the tilt angles e and f are preferably 60° to 120°, and more preferably 75° to 105°.

(Thickness)

In FIG. 4, the thickness of the feed-side channel material substantially corresponds to the thickness of the intersection of the fibrous material A with the fibrous material B. If the thickness of the feed-side channel material is thinner, the linear velocity of the feed water is increased and the flow thereof on the membrane surface is disturbed. Therefore, the concentration polarization layer becomes thinner, and the separation performance of the separation membrane element improves. In addition, the thinner the channel material, the more separation membranes can be filled in the separation membrane element, which leads to the improvement of the fresh water production rate of the separation membrane element. However, when the thickness of the feed-side channel material is excessively thin, impurities in the feed water and foulants such as microorganisms tend to block the feed-side flow channel. As a result, there arises problems such that the fresh water production performance of the separation membrane element decreases, the flow resistance of the separation membrane element increases, the power cost increases since the power required for the pump feeding the feed water increases, and the separation membrane element breaks, which are not preferable. Therefore, the thickness of the feed-side channel material needs to be 0.15 mm to 0.50 mm, and preferably 0.28 mm to 0.35 mm.

The thickness of the feed-side channel material is the average value of the thicknesses of 30 randomly-selected intersections of fibrous materials A with fibrous materials B measured with a precision thickness gauge or the like.

In addition, it is not preferable that the variation in the thickness of the feed-side channel material is large since the performance of the reverse osmosis membrane cannot be exerted uniformly. Therefore, each of the thicknesses of the intersections of the fibrous materials A with the fibrous materials B is preferably 0.9 to 1.1 times the average thickness of the feed-side channel material.

(Constituent Fiber Diameter of Fibrous Material)

The constituent fiber diameter of the fibrous material can be measured by observation with a commercially available microscope or the like. The constituent fiber diameter of the fibrous material A 11 and the constituent fiber diameter of the fibrous material B 12 illustrated in FIG. 4 are each an average value obtained by performing measurements on 30 points which are randomly selected on the widths c and d of images obtained by projecting each of the fibrous materials on a plane parallel to the plane direction of the separation membrane. The smaller the constituent fiber diameter of the feed-side channel material illustrated in FIG. 4 is, the smaller the region where the feed water stagnates, but the lower the rigidity. On the other hand, the larger the constituent fiber diameter is, the higher the rigidity but the larger the region where the teed water stagnates. From the balance of the above, the constituent fiber diameter of the feed-side channel material is preferably 0.07 mm to 0.25 mm, and more preferably 0.14 mm to 0.18 mm. The constituent fiber diameter of the fibrous material A and the constituent fiber diameter of the fibrous material B may be the same or different.

(Intersection Interval of Fibrous Materials)

When comparing the intersection intervals of the feed-side channel material with each other under the condition that the constituent fiber diameters of the fibrous materials A and the fibrous materials B are all the same, the flow rate of the feed water is slower and the pressure loss is reduced as the interval is wider. Meanwhile, the flow rate of the feed water is increased and the pressure loss is increased as the intersection interval is narrower.

From the balance of the above, the intersection interval of the feed-side channel material is preferably 0.5 mm to 10 mm.

Particularly, in a case where the TOC (total organic carbon) of the feed water is high and the water production performance of the separation membrane is high, the organic fouling tends to adhere to the membrane surface with which the fibrous material of the feed-side channel material is not in contact. Therefore, the intersection interval of the feed-side channel material of 1.5 mm or less is effective to prevent adhesion of organic fouling to the membrane surface.

Additionally, in preparing the separation membrane element, in a case where the feed-side channel material is sandwiched by the separation membranes and the permeate-side channel material is stacked to form one unit, followed by being would around the water collection tube under pressure, the force with which the intersection of the net is pressed against the separation membrane can be dispersed, and damage to the separation membrane can be reduced when the intersection interval of the feed-side channel material is 1.5 mm or less.

On the other hand, when the hardness of the feed water is high and the water production performance and removal performance of the separation membrane is high, particularly in a high recovery ratio operation, a region where the feed water stagnates mainly occurs at the intersection of the feed-side channel material, the salt concentration rises locally and the inorganic scale adheres. Therefore, the intersection interval of the feed-side channel material of 8 mm or more is effective to prevent adhesion of the inorganic scale to the membrane surface. The upper limit of the intersection interval is preferably 10 mm in order to ensure the winding hardness of the element and to reduce the excessive load on the membrane.

As illustrated in FIG. 4, when there are two kinds of intersection intervals a and b for one void of the feed-side channel material, a, which is the shorter one, is selected, and 30 points randomly selected are observed with a commercially available microscope or the like and measurement is performed. The average value thereof is taken as the intersection interval of the fibrous material.

(Intersection Density)

The intersection density refers to the number of the intersections of the fibrous materials A with the fibrous materials B constituting the feed-side channel material present per unit area. For example, the intersection density can be obtained by observing the feed-side channel material from a height direction with respect to the plane surface and measuring the number of intersections present per randomly-selected 100 $mm^2$.

For example, when the mesh shape of the feed-side channel material is constant, the higher the intersection density, the narrower the intersection interval of the fibrous materials; and the lower the intersection density, the wider the intersection interval of the fibrous materials.

When the intersection density is 15 to 210 per 100 $mm^2$, the flow rate of the feed water can be slow. As a result, the resistance of the feed-side channel can be reduced and a separation membrane element having excellent water production performance can be obtained even when the separation membrane has high water production performance and the amount of water fed to the separation membrane element is large.

On the other hand, particularly when the feed water has a high hardness and a high recovery ratio operation is performed, the intersection density of 3 or less per 100 $mm^2$ is effective to prevent adhesion of the inorganic scale to the membrane surface since the region where the feed water stagnates at the intersection of the feed-side channel material decreases.

(Cross-Sectional Shape of Fibrous Material)

Since it is important to increase the degree of turbulence around the surface of the separation membrane in feed-side flow channel, fibrous materials with irregular shapes can be used instead of circular or elliptical in cross section. The "irregular" cross section includes all non-circular shapes, and incudes, for example, a shape having a recess portion in a cross section such as a Y shape, a T shape, an X shape, a star shape, and a gear shape, in addition to a polygonal shape. When a recess portion is present in the fibrous material, a region where the feed water easily flows and a region where the feed water hardly flows coexist around the feed-side channel material, and due to such a difference, a vortex is generated in the flow to form a turbulent flow.

Molding of the fibrous materials with irregular cross section is a technique well known in the art. For example, by changing the shape of the extrusion die as necessary, fibrous materials having various irregular cross sections can be molded.

(Material)

The material of the feed-side channel material is not particularly limited. From the viewpoint of moldability, a thermoplastic resin is preferred, and polyethylene and polypropylene are particularly preferred because they are less likely to scratch the surface of the separation membrane and are inexpensive.

<Permeate-Side Channel Material>

(Outline)

The separation membrane element according to the present invention is arranged with a permeate-side channel material on the permeate-side face of the separation membrane. In the present invention, as the permeate-side channel material, a sheet obtained by forming projections by subjecting a film or nonwoven fabric to unevenness processing to impart a channel material function, or a sheet obtained by arranging and fixing projections on a porous sheet such as a nonwoven fabric can be used.

(Cross-Sectional Area Ratio)

Figure 5:
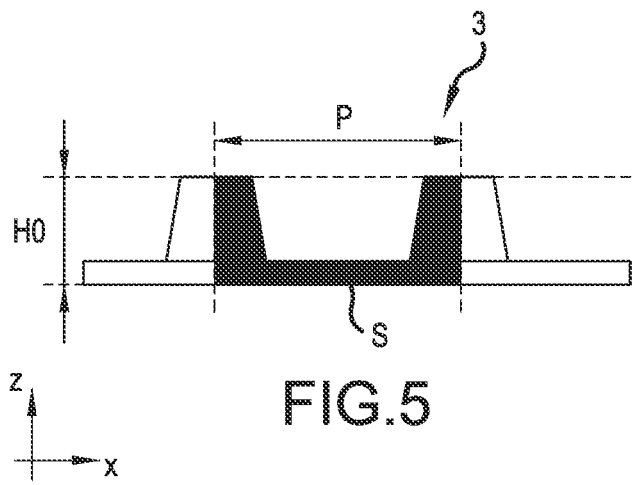
FIG. 5 illustrates an example of a cross-sectional view of a permeate-side channel material applied to the present invention.

The permeate-side channel material preferably has a cross-sectional area ratio of 0.4 to 0.75 in terms of reducing the flow resistance of the permeate-side flow channel and stably forming the flow channel even under pressure filtration. Here, the cross-sectional area ratio of the permeate-side channel material is described. FIG. 5 illustrates, as an example, a sheet-like permeate-side channel material. The permeate-side channel material is cut so as to pass through a protruding portion of the permeate-side channel material along the direction parallel to the longitudinal direction of the water collection tube when the permeate-side channel material is filled in the separation membrane element. As for the cross section thereof, a ratio of the product of the distance P (also referred to as pitch) between the center of one protruding portion and the center of another protruding portion adjacent thereto and the height H0 of the permeate-side channel material to the cross-sectional area S of the permeate-side channel material occupying between the center of one protruding portion and the center of another protruding portion adjacent thereto, is defined as the cross-sectional area ratio.

Figure 6:
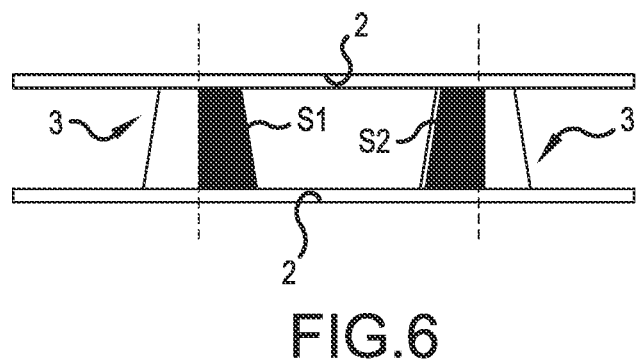
FIG. 6 illustrates another example of a cross-sectional view of the permeate-side channel material applied to the present invention.

When the permeate-side channel material is directly fixed to the permeate-side face of the separation membrane as illustrated in FIG. 6, the cross-sectional area ratio can also be calculated in the same method. However, there are a plurality of permeate-side channel materials in this case, there are two cross-sectional areas (S1 and S2) of the permeate-side channel material occupying between the center of the protruding portion and the center of the protruding portion adjacent thereto, and the cross-sectional area S corresponds to the sum of S1 and S2.

As a specific measurement method, for the 30 randomly-selected sites, as described above, each of the permeate-side channel material is cut, the measurement is performed using a microscope image analyzer, and the average value can be calculated.

When a permeate-side channel material having a cross-sectional area ratio of 0.4 to 0.75 is arranged in the separation membrane element according to the present invention, the flow resistance of the permeate-side channel material can be reduced, and as a result, the water permeability per unit membrane area can be improved. The fact that the water permeability per unit membrane area is improved means that the fresh water production performance of the entire separation membrane element is improved. When operating at a constant recovery ratio, the flow rate and the linear velocity of the feed water are increased compared with a separation membrane element including a channel material having high flow resistance on the permeate side, and the concentration polarization is prevented by increasing the turbulent effect on the membrane surface. In addition, the adhesion of contaminations to the separation membrane and the feed-side channel material can be prevented during the long-term operation, and the freshwater production performance and removal performance of the separation membrane element can be maintained over a long period of time.
(Thickness)

Figure 7:
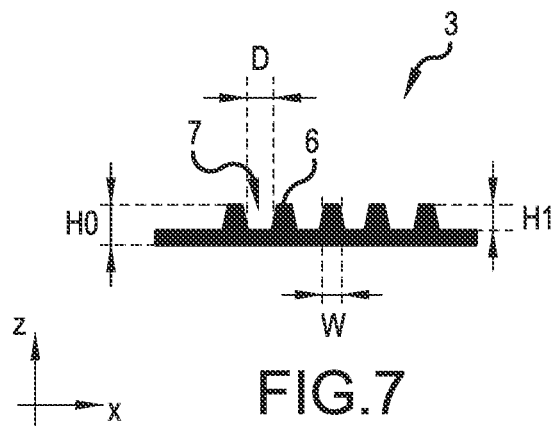
FIG. 7 illustrates an example of a cross-sectional view showing the shape of the permeate-side channel material applied to the present invention.

The thickness H0 of the permeate-side channel material in FIG. 7 is preferably 0.1 mm or more and 1 mm or less. As measurement of the thickness, various film thickness measuring instruments such as an electromagnetic type, an ultrasonic type, a magnetic type, and a light-transmission type are commercially available, but any method may be used as long as it is a non-contact type. The measurement is performed randomly at 10 sites, and the average value thereof is taken as the thickness of the permeate-side channel material. When the thickness of the permeate-side channel material is 0.1 mm or more, the strength as a permeate-side channel material can be obtained and the permeate-side channel material can be handled without crushing or tearing even if the stress is applied. When the thickness of the permeate-side channel material is 1 mm or less, the number of separation membranes and permeate-side channel materials which can be filled in the separation membrane element can be increased without impairing the winding property to the water collection tube.

When the permeate-side channel material is directly fixed to the permeate-side face of the separation membrane as illustrated in FIG. 6, the thickness H0 of the permeate-side channel material is the same as the height H1 of the protruding portion of the permeate-side channel material which will be described later.
(Height of Protruding Portion, Groove Width and Groove Length of Permeate-Side Channel Material)

The height H1 of the protruding portion of the permeate-side channel material in FIG. 7 is preferably 0.05 mm to 0.8 mm, and the groove width D is preferably 0.02 mm to 0.8 mm. The height H1 of the protruding portion and the groove width D can be obtained by observing the cross section of the permeate-side channel material with commercially available microscope or the like for 30 randomly-selected points and calculating as an average value thereof.

The space formed by the height H1 of the protruding portion, the groove width D, and the stacked separation membrane is the permeate-side flow channel, and when the height H1 of the protruding portion and the groove width D are within the above ranges, a separation membrane element having reduced flow resistance and excellent pressure resistance and fresh water production performance can be obtained while preventing membrane sinking during pressure filtration.

In addition, when the protruding portion is arranged to be spaced apart in any direction like the dot shape (see FIG. 8), the groove length E can be set similarly to the groove width D.
(Width and Length of Protruding Portion)

The width W of the protruding portion of the permeate-side channel material in FIG. 7 is preferably 0.1 mm or more, and more preferably 0.3 mm or more. When the width W is 0.1 mm or more, even when pressure is applied to the permeate-side channel material during the operation of the separation membrane element, the shape of the protruding portion can be maintained and the permeate-side flow channel is stably formed. The width W is preferably 1 mm or less, and more preferably 0.7 mm or less. When the width W is 1 mm or less, the permeate-side flow channel can be ensured sufficiently.

Figure 9:
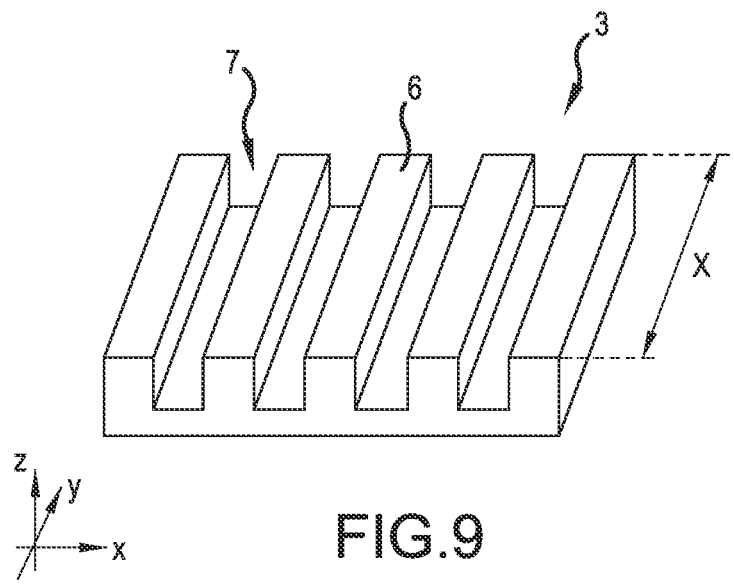
FIG. 9 illustrates another example of the permeate-side channel material applied to the present invention.

The width W of the protruding portion 6 is measured as follows. First, in one cross section perpendicular to a first direction, an average value of the maximum width and the minimum width of one protruding portion 6 is calculated. That is, in the protruding portion 6 whose upper portion is thin and whose lower portion is thick as illustrated in FIG. 9, the width of the lower portion and the width of the upper portion of the channel material are measured, and an average value thereof is calculated. By calculating such an average value for at least 30 cross sections and calculating the arithmetic average thereof, the width W per one membrane can be calculated.

When the protruding portion is arranged to be spaced apart in any direction like the dot shape (see FIG. 8), the length X of the protruding portion of the permeate-side channel material can be set similarly to the width W.
(Material)

As the sheet constituting the permeate-side channel material, a porous film, a nonwoven fabric or the like can be used. Particularly in the case of a nonwoven fabric, the space serving as the flow channel formed by the fibers constituting the nonwoven fabric is wider, so that water tends to flow and, as a result, the fresh water production performance of the separation membrane element is improved, which is preferable.

The polymer as the material of the permeate-side channel material is not particularly limited as long as it retains the shape as the permeate-side channel material and elution of the component into the permeate is little. Examples the polymer include: polyamides such as nylon, polyesters, polyacrylonitriles, polyolefins such as polyethylene and polypropylene, polyvinyl chlorides, polyvinylidene chlorides, and polyfluoroethylenes, in consideration of strength enough to withstand high pressure and hydrophilicity, polyolefin-based and polyester-based polymers are preferred.

When the sheet material includes a plurality of fibers, for example, one having a polypropylene/polyethylene core-sheath structure may be used as the fiber.
(Flow Channel Formed by Permeate-Side Channel Material)

When the separation membrane is arranged on both faces of the permeate-side channel material, the space between a protruding portion and a protruding portion adjacent thereto becomes a flow channel of the permeate. The flow channel may be formed by processing the permeate-side channel material itself into a corrugated shape, a rectangular wave shape, a triangular wave shape or the like, may be formed in such a manner that one surface of the permeate-side channel material is flat and the other surface is processed into an uneven shape, or may be formed by stacking another member on the surface of the permeate-side channel material in an uneven shape.
(Shape)

Figure 8:
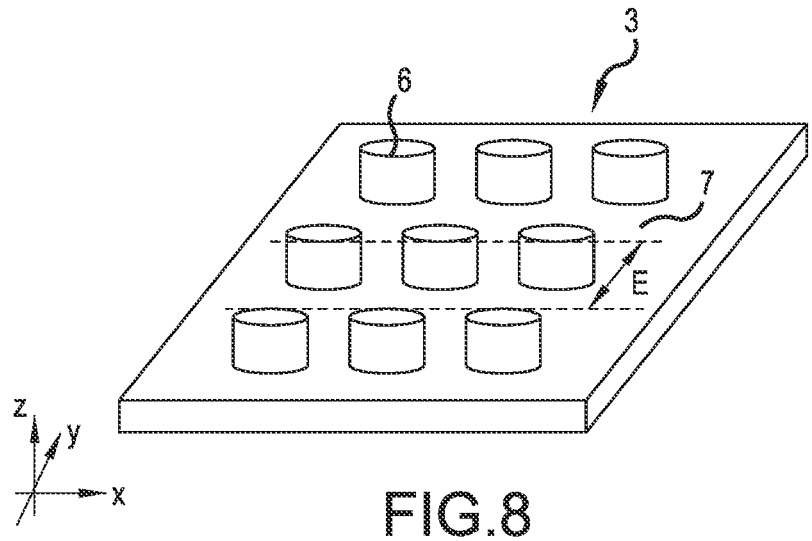
FIG. 8 illustrates an example of the permeate-side channel material applied to the present invention.

In the permeate-side channel material applied to the separation membrane element according to the present invention, the protruding portion forming the flow channel may have the dot shape as illustrated in FIG. 8. When the alignment of the dots is arranged in a staggered fashion, the stress at the time of receiving the feed water is dispersed, which is advantageous for preventing depression. A columnar projection having a circular cross section (a plane parallel to the sheet plane) is described in FIG. 8, however, the sectional shape is not particularly limited, and may be shapes such as a polygon and an ellipse. In addition, protruding portions having different cross sections may coexist. Further, it may also be an uneven shape having grooves which are arranged in one direction and are continuous as illustrated in FIG. 9. In order to introduce the permeate into the water collection tube at the shortest distance, it is preferable that the grooves are continuous in a direction perpendicular to the longitudinal direction of the water collection tube.

It may have a shape varying in width in the cross-sectional shape in the direction perpendicular to the winding direction, such as a trapezoidal wall-like structure, an elliptic column, an elliptic cone, a quadrangular pyramid or a hemisphere.

<Water Treatment System>

The separation membrane element according to the present invention can be applied to a water treatment system such as an RO water purifier, for example. Particularly when a separating membrane excellent in fresh water production performance and desalination performance is mounted and the separation membrane element is operated by setting a high recovery ratio (ratio of permeate amount to feed water amount), the organic foulant amount and the inorganic scale amount fed to the membrane surface are increased, the generation of fouling occurs along with the above, the effective pressure of the separation membrane element decreases due to an increase in osmotic pressure, and the desalination ratio and the fresh water production performance of the separation membrane element tend to be lowered. However, in the separation membrane element according to the present invention, since the membrane surface linear velocity is improved, the concentration polarization decreases and the turbulence effect increases. Therefore, the generation of fouling can be prevented from occurring. Accordingly, excellent fresh water production performance and desalination performance can be obtained over a long period of time even when operating with the recovery ratio set to 60% or more.

EXAMPLES

Hereinafter, the present invention is described in more detail with reference to examples, but the present invention is not limited to these examples.

(Intersection Interval of Feed-Side Channel Material)

As for one void of the feed-side channel material, the distances between the intersection of the fibrous material A with the fibrous material B constituting the feed-side channel material and another intersection of the fibrous material A with the fibrous material B not adjacent to the above intersection were measured using a high-precision configuration analysis system KS-1100 manufactured by KEYENCE CORPORATION. Among the two kinds of distances obtained, the shorter one was taken for the measurement. Similar measurements were performed on 30 voids, and the average value of the distances was taken as the intersection interval of the fibrous material.

(Intersection Density of Feed-Side Channel Material)

A randomly-selected portion of the feed-side channel material was cut out at a plane of 100 mm$^2$ and the number of intersections of the fibrous material A with the fibrous material B was counted by observing from the top of the plane. Next, the same operation was performed on the other planes of the same feed-side channel material 30 times in total, and the average value thereof was taken as the intersection density (number per 100 mm$^2$).

(Constituent Fiber Diameters of Fibrous Material A and Fibrous Material B)

The thicknesses of fibrous material A and fibrous material B were measured on 30 points using a thickness gauge (product number 547-315) manufactured by Mitutoyo Corporation, and the average values thereof were taken as the constituent fiber diameters of the fibrous material A and the fibrous material B.

<Thickness of Feed-Side Channel Material>

The thickness of the intersection of the mesh-shape feed-side channel material (net) including the fibrous material A and the fibrous material B was measured on 30 points using a thickness gauge (product number 547-315) manufactured by Mitutoyo Corporation, and the average value thereof was taken as the thickness of the feed-side channel material.

(Distances Between Fibrous Materials A and Distances Between Fibrous Materials B)

The distances between 30 randomly-selected fibrous materials A. and adjacent fibrous materials A constituting the mesh-shape feed-side channel material were measured using a high-precision configuration analysis system KS-1100 manufactured by KEYENCE CORPORATION, and the average value thereof was taken as the distance between the fibrous materials A.

The similar measurement was also performed on the fibrous materials B to calculate the distance between the fibrous materials B. In the Example, since the lattice shapes formed by the fibrous materials A and the fibrous materials B (described as the mesh shape in the table) were all square, the distance between the fibrous materials A and the distance between the fibrous materials B were the same. Therefore, only one side is shown as the distance between fibrous materials in the table.

(Preparation of Separation Membrane a)

On a nonwoven fabric including polyethylene terephthalate fibers (fineness: 1 dtex, thickness: about 90 μm, air permeability: 1 cc/cm$^2$/sec, density: 0.80 g/cm$^3$), a 17.0 mass % DMF solution of polysulfone was cast to a thickness of 180 μm at room temperature (25° C.). Immediately thereafter, the fabric was immersed in pure water, left therein for 5 minutes, and immersed in hot water at 80° C. for 1 minute to prepare a porous supporting layer (thickness: 130 μm) roll including a fiber-reinforced polysulfone supporting membrane.

Thereafter, the surface of the polysulfone layer of the porous supporting membrane was immersed in a 2.2 mass % aqueous solution of m-PDA for 2 minutes and then slowly drawn up in the vertical direction. Further, the excessive aqueous solution was removed from the surface of the supporting membrane by spraying nitrogen from an air nozzle.

Thereafter, an n-decane solution containing 0.08 mass % of trimesic acid chloride was applied, so that the surface of the membrane was completely wetted, and then the membrane was allowed to stand for 1 minute. Thereafter, the excess solution was removed from the membrane by air blow and washed with hot water at 80° C. for 1 minute to obtain a composite separation membrane roll. This separation membrane was taken as separation membrane a.

(Preparation of Separation Membrane b)

On a polyester nonwoven fabric (air permeability: 0.5 cc/cm$^2$/sec to 1 cc/cm$^2$/sec$^3$), a 15.7 mass % DMF solution of polysulfone was cast to a thickness of 200 μm at room temperature (25° C.). Immediately thereafter, the fabric was immersed in pure water and left therein for 5 minutes to prepare a microporous supporting membrane (thickness: 210 μm to 215 μm).

The obtained microporous supporting membrane was immersed in a 1.8 mass % aqueous solution of m-PDA for 2 minutes, and the supporting membrane was slowly drawn up in the vertical direction. Further, the excessive aqueous solution was removed from the surface of the supporting membrane by spraying nitrogen from an air nozzle. Then, an n-decane solution at 25° C. containing 0.065 mass % of TMC and 0.1 mass % of undecanoic acid was applied, so that the surface was completely wetted, and then the membrane was allowed to stand for 1 minute. Then, the membrane was drained by holding vertically for 1 minute to remove the excess solution from the membrane. Thereafter, the membrane was washed with hot water at 80° C. for 2 minutes to obtain a composite separation membrane roll. This separation membrane was taken as separation membrane b.

(Preparation of Separation Membrane c)

On a polyester nonwoven fabric (air permeability: 0.5 cc/cm$^2$/sec to 1 cc/cm$^2$/sec$^3$), a 15.7 mass % DMF solution of polysulfone was cast to a thickness of 200 μm at room temperature (25° C.). Immediately thereafter, the fabric was immersed in pure water and left therein for 5 minutes to prepare a microporous supporting membrane (thickness: 210 μm to 215 μm).

The obtained microporous supporting membrane was immersed in a 1.8 mass % aqueous solution of m-PDA for 2 minutes, and the supporting membrane was slowly drawn up in the vertical direction. Further, the excessive aqueous solution was removed from the surface of the supporting membrane by spraying nitrogen from an air nozzle. Then, an n-decane solution at 25° C. containing 0.065 mass % of TMC and 0.1 mass % of undecanoic acid was applied so that the surface was completely wetted, and after 10 seconds, a 1 mass % n-decane solution of diethylene glycol dimethyl ether was further applied, so that the surface was completely wetted, and then the membrane was allowed to stand for 1 minute. Then, the membrane was drained by holding vertically for 1 minute to remove the excess solution from the membrane. Thereafter, the membrane was washed with hot water at 80° C. for 2 minutes to obtain a composite separation membrane roll. This separation membrane was taken as separation membrane c.

(Preparation of Separation Membrane d)

On a nonwoven fabric including polyethylene terephthalate fibers (fineness: 1 dtex, thickness: about 90 μm, air permeability: 1 cc/cm$^2$/sec, density: 0.80 g/cm$^3$), a 17.0 mass % DMF solution of polysulfone was cast to a thickness of 180 μm at room temperature (25° C.). Immediately thereafter, the fabric was immersed in pure water, left therein for 5 minutes, and immersed in hot water at 80° C. for 1 minute to prepare a porous supporting layer (thickness: 130 μm) roll including a fiber-reinforced polysulfone supporting membrane.

Thereafter, the surface of the polysulfone layer of the porous supporting membrane was immersed in a 3.0 mass % aqueous solution of m-PDA for 2 minutes and then slowly drawn up in the vertical direction. Further, the excessive aqueous solution was removed from the surface of the supporting membrane by spraying nitrogen from an air nozzle.

Thereafter, an n-decane solution containing 0.1 mass % of trimesic acid chloride was applied, so that the surface of the membrane was completely wetted, and then was allowed to stand for 1 minute. Thereafter, the excess solution was removed from the membrane by air blow and washed with hot water at 80° C. for 1 minute to obtain a composite separation membrane roll. This separation membrane was taken as separation membrane d.

(Preparation of Separation Membranes e, f, g and h)

On a nonwoven fabric including polyester fibers manufactured by the papermaking process (air permeability: 1.0 cc/cm$^2$/sec$^3$), a 15 mass % DMF solution of polysulfone was cast to a thickness of 180 μm at room temperature (25° C.). Immediately thereafter, the fabric was immersed in pure water for 5 minutes to form a porous supporting layer on the substrate to prepare a porous supporting membrane.

Next, the membrane was immersed in an aqueous solution, in which 2.0 mass % of 2-ethylpiperazine, 100 ppm of sodium dodecyl diphenyl disulfonate, and 1.0 mass % of trisodium phosphate were dissolved, for 10 seconds, and then the excessive aqueous solution was removed by spraying nitrogen from an air nozzle. The pH of the aqueous amine solution at this time was 12.0. Subsequently, an n-decane solution containing 0.2 mass % of trimesic acid chloride heated to 70° C. was uniformly applied on the surface of the porous supporting layer and was held at a membrane surface temperature of 60° C. for 3 seconds. Then, the membrane surface temperature was cooled down to 10° C. and the membrane was left at this temperature for 1 minute in an air atmosphere to form a separation functional layer, and then the membrane was vertically held and drained. The obtained membrane was washed with pure water at 60° C. for 2 minutes to obtain a separation membrane roll. This separation membrane was taken as separation membrane e.

In preparing the separation membranes, a separation membrane obtained by changing the membrane surface temperature at the time of contact between amine and trimesic acid chloride to 40° C. and changing the membrane surface temperature at the time of interfacial polymerization to 10° C. was prepared as separation membrane f. In preparing the separation membranes, a separation membrane obtained by changing the membrane surface temperature at the time of contact between amine and trimesic acid chloride to 70° C. and changing the membrane surface temperature at the time of interfacial polymerization to 10° C. was prepared as separation membrane g. In preparing the separation membranes, a separation membrane obtained by changing the membrane surface temperature at the time of contact between amine and trimesic acid chloride to 60° C. and changing the membrane surface temperature at the time of interfacial polymerization to 10° C. was prepared as separation membrane h.

(Flux of Separation Membrane)

The separation membrane was cut out in 47 cm$^2$, and in a membrane evaluation cell, an aqueous sodium chloride solution having a concentration of 200 ppm and a pH of 6.5 was used as the feed water, operation was performed for 15 minutes under conditions of an operation pressure of 0.41 MPa, a temperature of 25° C., and a recovery ratio of 1% or less, and then sampling for 1 minute was performed. The water permeation rate per day was taken as the separation membrane flux (m$^3$/m$^2$/day).

(Pure Water Permeation Coefficient and Solute Permeation Coefficient of Separation Membrane)

The pure water permeation coefficient was calculated by the following method.

Pure water permeation coefficient (m$^3$/m$^2$/sec/Pa)= (membrane permeation flux of solution)/(pressure difference between both sides of membrane−osmotic pressure difference between both sides of membrane×solute reflection coefficient)  (a)

The solute reflection coefficient can be obtained by the following method. First, the following formulae are known as the transport formulae of the reverse osmosis method based on nonequilibrium thermodynamics.

$Jv = Lp(\Delta P - \sigma \cdot \Delta \pi)$  (b)

$Js = P(Cm - Cp) + (1-\sigma)C \cdot Jv$  (c)

Here, Jv represents the membrane permeation flux (m³/m²/s) of the solution, Lp represents the pure water permeation coefficient (m³/m²/s/Pa), ΔP represents the pressure difference (Pa) between both sides of the membrane, σ represents the solute reflection coefficient, Δπ represents the osmotic pressure difference (Pa) between both sides of the membrane, Js represents the membrane permeation flux (mol/m²/s) of the solute, P represents the solute permeation coefficient (m/s), Cm represents the membrane surface concentration (mol/m³) of the solute, Cp represents the permeated liquid concentration (mol/m³), and C represents the concentration (mol/m³) on both sides of the membrane. The average concentration C on both sides of the membrane has no substantial meaning when the concentration difference between both sides is very large as the reverse osmosis membrane. Therefore, the following formula obtained by integrating the formula (a) with respect to the membrane thickness is often used:

$$R=\sigma(1-F)/(1-\sigma F) \quad (d)$$

provided that, $$F=\exp\{-(1-\sigma)Jv/P\} \quad (e)$$

in which R represents a true rejection ratio and is defined as:

$$R=1-Cp/Cm \quad (f)$$

Lp can be calculated based on formula (b) by variously changing ΔP. R is obtained by variously changing iv. P and can be obtained at the same time by curve-fitting the formulae (d) and (e) to the plots of R and 1/Jv.

The relationship of the following formula (g) is formed for P and the desalination ratio R of the separation membrane.

$$R=100\times Jv/(Jv+P) \quad (g)$$

<Fresh Water Production Rate of Separation Membrane Element>

Evaluation on the separation membrane element was performed based on the following three evaluation conditions.

(Condition 1) An aqueous sodium chloride solution having a concentration of 200 ppm and a pH of 6.5 was used as the feed water, operation was performed for 15 minutes under conditions of an operation pressure of 0.41 MPa and a temperature of 25° C., and then sampling was performed for 1 minute. The water permeation rate per day was expressed as the fresh water production rate (GPD, gallons per day).

(Condition 2) An aqueous solution containing NaCl, CaCl₂, Na₂SO₄ and having a salt concentration of 200 ppm and a pH of 6.5 was used as the feed water, operation was performed for 30 minutes under conditions of an operation pressure of 0.41 MPa and a temperature of 25° C., and then sampling was performed for 1 minute. The water permeation rate per day was expressed as the fresh water production rate (m³/day). In addition, when the total fresh water production rate of the separation membrane element reached 3000 L, the sampling was performed for 1 minute and the water permeation rate per day was expressed as the fresh water production rate (m³/day).

(Condition 3) Tap water (from Shanghai, China) with a total carbon (TC) of 35 ppm, a total organic carbon (TOC) of 3.8 ppm, a TDS concentration of 350 ppm, and a pH of 7.3 was used as the feed water, operation was performed for 30 minutes under conditions of an operation pressure of 0.41 MPa and a temperature of 25° C., and then sampling was performed for 1 minute. The water permeation rate per day was expressed as the fresh water production rate (m³/day). In addition, when the total fresh water production rate of the separation membrane element reached 3000 L, the sampling was performed for 1 minute and the water permeation rate per day was expressed as the fresh water production rate (m³/day).

(Recovery Ratio)

In the measurement of the fresh water production rate, the ratio of the flow rate $V_F$ of the feed water fed at a predetermined time period and the permeate amount $V_P$ at the same time period was taken as the recovery ratio, and the recovery ratio was calculated based on $V_P/V_F\times 100$.

(Desalination Ratio (TDS Removal Ratio))

For the feed water used in operation for 1 minute for measurement of the fresh water production rate of the separation membrane element and the sampled permeate, the TDS concentration was measured by conductivity measurement, and based on the following formula, the desalination ratio was calculated.

Desalination ratio (%)=100×{1−(TDS concentration in permeate/TDS concentration in feed water)}

(Preparation of Permeate-side Channel Material Tricot Using Weft Knitted Fabric)

The weft knitted fabric was prepared by knitting a weft knit structure of plain knitted fabric (gauge (number of needles between unit lengths of knitting machine)) using, as a knitting yarn, a multifilament yarn (48 filaments and 110 dtex) obtained by mixing a polyethylene terephthalate low melting point polyester filament (melting point: 235° C.) with a polyethylene terephthalate filament (melting point: 255° C.). The weft knit fabric is subjected to heat setting treatment at 245° C., then calendering, thereby preparing the permeate-side channel material tricot.

In Table 2, this permeate-side channel material was shown as the permeate-side channel material A.

(Preparation of Permeate-Side Channel Material Having Projections on Nonwoven Fabric)

Using an applicator loaded with a comb-shaped shim having a slit width of 0.5 mm and a pitch of 0.9 mm, composition pellets containing 60 mass % of highly crystalline PP (MFR: 1,000 g/10 min, melting point: 161° C.) and 40 mass % of a low crystalline α-olefinic polymer (manufactured by Idemitsu Kosan Co., Ltd., low stereoregular polypropylene "L-MODU S400" (trade name)) were linearly or discontinuously applied onto the nonwoven fabric at a resin temperature of 205° C. and a travelling speed of 10 m/min so as to become perpendicular to the longitudinal direction of a water collection tube when a separation membrane element was formed and so as to become perpendicular to the longitudinal direction of a water collection tube from an inside end to an outside end in the winding direction when an envelope-shaped membrane was formed, while adjusting the temperature of a backup roll to 20° C. The nonwoven fabric had a thickness of 0.07 mm and a basis weight of 35 g/m², and had an embossed pattern (a circle having a diameter of 1 mm, a lattice having a pitch of 5 mm).

In Table 2, this permeate-side channel material was shown as the permeate-side channel material B.

(Preparation of Permeate-Side Channel Material Using Film Having Through Hole)

Imprint treatment and CO₂ laser treatment were applied to an unstretched polypropylene film (Torayfan (registered trademark) manufactured by Toray Industries, Inc.) to obtain a permeate-side channel material having through holes. Specifically, the unstretched polypropylene film was sandwiched between metallic molds having grooves formed by cutting, kept at 140° C. and 15 MPa for 2 minutes, cooled at 40° C., and then taken out from the mold.

Subsequently, using a 3D-Axis $CO_2$ Laser Marker MLZ 9500, laser treatment was performed on the recess portion in the unevenness from the even surface of an unevenness imprinting sheet, to obtain through holes. The through holes were provided in each groove with a pitch of 2 mm.

In Table 2, this permeate-side channel material was shown as the permeate-side channel material C.

(Adhered Amount of Inorganic Scale)

The separation membrane that had been evaluated under (Condition 3) and had reached 3000 L of the total fresh water production rate was disassembled, and the adhered substances on the membrane surface were extracted with a 1 wt % aqueous solution of nitric acid. The total adsorption amount (g) of inorganic components (calcium, magnesium, barium) was measured using a P-4010 type ICP (high frequency inductively coupled plasma emission spectrometry) apparatus manufactured by Hitachi, Ltd. The adhered amount of the inorganic scale ($g/m^2$) was calculated based on the membrane area of the separation membrane element.

(Total Amount of Adhered Substances)

The separation membrane that had been evaluated under (Condition 3) and had reached 3000 L of the total fresh water production rate was disassembled, and the adhered substances adhering to the membrane surface were collected with a rubber scraper. Then, the adhered substances were dried at 120° C. for 2 hours, and the mass was measured to calculate the total amount of the adhered substances ($g/m^2$) based on the membrane area of the separation membrane element.

(Adhered Amount of Organic Fouling)

The difference between the total amount of the adhered substances and the adhered amount of the inorganic scale was calculated as the amount of the organic fouling adhered ($g/m^2$).

(Thickness of Permeate-Side Channel Material, and Height of Protruding Portion of Permeate-Side Channel Material)

The thickness of the permeate-side channel material and the height of the protruding portion of the permeate-side channel material were measured with a high-precision configuration analysis system KS-1100 manufactured by KEYENCE CORPORATION. Specifically, an average height difference was analyzed based on a measurement result of 5 cm×5 cm using the high-precision configuration analysis system KS-1100 manufactured by KEYENCE CORPORATION. 30 points with a height difference of 10 µm or more were measured, and the average value thereof was taken as the height of the protruding portion.

(Width and Length of Protruding Portion, Groove Width and Groove Length of Recess Portion of Permeate-Side Channel Material)

The measurement was performed in the same manner as the thickness of the permeate-side channel material and the height of the protruding portion using the high-precision configuration analysis system KS-1100 manufactured by KEYENCE CORPORATION.

(Pitch of Protruding Portion of Permeate-Side Channel Material)

Using the high-precision configuration analysis system KS-1100 manufactured by KEYENCE CORPORATION, the horizontal distance from a peak of the channel material on the permeate side of the separation membrane to a peak of a neighboring channel material was measured at 200 points, and the average value thereof was taken as the pitch of the protruding portion.

(Cross-sectional Area Ratio of Permeate-Side Channel Material)

The permeate-side channel material was cut so as to pass through a protruding portion of the permeate-side channel material along the direction parallel to the longitudinal direction of the water collection tube when the permeate-side channel material was filled in the separation membrane element. As for the cross section thereof, the distance (also referred to as pitch) between the center of one protruding portion and the center of another protruding portion adjacent thereto and the height of the permeate-side channel material were measured using a microscope image analyzer, and a ratio (cross-sectional area ratio) of the product of the above distance and the height to the cross-sectional area of the permeate-side channel material occupying between the center of one protruding portion and the center of another protruding portion adjacent thereto was calculated. Similar measurements were performed on 30 points, and the average value of the distances was shown in Table 2.

Example 1

The separation membrane a obtained by the above preparation method was cut and processed, and the polypropylene net (thickness: 300 µm, intersection interval: 8 mm, fiber diameter: 0.15 mm, tilt angle: 90°) shown in Table 2 was sandwiched and folded as a feed-side channel material to prepare a leaf.

The permeate-side channel material B (cross-sectional area ratio: 0.43) shown in Table 2 was stacked as a permeate-side channel material on the permeate-side face of the obtained leaf and a leaf adhesive was applied. The separation membrane pair was arranged such that the length of the side in the direction perpendicular to the longitudinal direction of the water collection tube is longer than the width of the separation membrane element, and was spirally wound around an ABS (acrylonitrile-butadiene-styrene) water collection tube (width: 298 mm, diameter: 17 mm, number of pores: 8× Linear 2 rows), and the outer periphery of the wound body was covered with a net (thickness: 0.7 mm, pitch: 5 mm×5 mm, fiber diameter: 350 µm, projected area ratio: 0.13) which had been molded by being continuously extruded into a tubular shape. Both ends of the covered wound body were cut to a length of 254 mm, and then a sealing plate (corresponding to the first end plate 91) for preventing inflow of the feed water from one end was attached. Thus, the feed port of the feed water was provided only on the outer periphery of the separation membrane element. Further, the end plate corresponding to the second end plate 92 was attached to the other end of the covered wound body, so as to prepare a separation membrane element having a diameter of 1.8 inches and having the concentrated fluid outlet at the other end of the separation membrane element. The obtained separation membrane element was placed in a pressure vessel and the performances thereof was evaluated under each of the above-described conditions. The separation membrane element which had been evaluated under (Condition 3) was disassembled, and the adhered amount of the inorganic scale, the total amount of the adhered substances, and the adhered amount of the organic fouling were measured. The results thereof were shown in Table 3. The effective membrane area in Table 1 is a region where the separation function is not deactivated due to the leaf adhesive in the separation membrane leaf.

TABLE 1-1

| | Element diameter | Separation membrane Type | Flux (m³/m²/day) | A³/B (×10⁻⁸ m²/sec²/MPa³) | Effective membrane area (m²) |
|---|---|---|---|---|---|
| Example 1 | 1.8 inches | a | 1.1 | 8.0 | 0.52 |
| Example 2 | 1.8 inches | a | 1.1 | 8.0 | 0.52 |
| Example 3 | 1.8 inches | a | 1.1 | 8.0 | 0.52 |
| Example 4 | 1.8 inches | a | 1.1 | 8.0 | 0.52 |
| Example 5 | 1.8 inches | a | 1.1 | 8.0 | 0.52 |
| Example 6 | 1.8 inches | a | 1.1 | 8.0 | 0.52 |
| Example 7 | 1.8 inches | a | 1.1 | 8.0 | 0.52 |
| Example 8 | 1.8 inches | a | 1.1 | 8.0 | 0.52 |
| Example 9 | 1.8 inches | a | 1.1 | 8.0 | 0.52 |
| Example 10 | 1.8 inches | a | 1.1 | 8.0 | 0.52 |
| Example 11 | 1.8 inches | a | 1.1 | 8.0 | 0.52 |
| Example 12 | 1.8 inches | a | 1.1 | 8.0 | 0.52 |
| Example 13 | 1.8 inches | a | 1.1 | 8.0 | 0.52 |
| Example 14 | 1.8 inches | a | 1.1 | 8.0 | 0.52 |
| Example 15 | 1.8 inches | a | 1.1 | 8.0 | 0.52 |
| Example 16 | 1.8 inches | a | 1.1 | 8.0 | 0.62 |
| Example 17 | 1.8 inches | a | 1.1 | 8.0 | 0.45 |
| Example 18 | 1.8 inches | a | 1.1 | 8.0 | 0.52 |
| Example 19 | 1.8 inches | a | 1.1 | 8.0 | 0.52 |
| Example 20 | 1.8 inches | a | 1.1 | 8.0 | 0.52 |
| Example 21 | 1.8 inches | a | 1.1 | 8.0 | 0.52 |
| Example 22 | 1.8 inches | a | 1.1 | 8.0 | 0.52 |
| Example 23 | 1.8 inches | a | 1.1 | 8.0 | 0.52 |
| Example 24 | 1.8 inches | a | 1.1 | 8.0 | 0.52 |
| Example 25 | 1.8 inches | a | 1.1 | 8.0 | 0.52 |
| Example 26 | 1.8 inches | a | 1.1 | 8.0 | 0.52 |
| Example 27 | 1.8 inches | a | 1.1 | 8.0 | 0.52 |
| Example 28 | 1.8 inches | a | 1.1 | 8.0 | 0.52 |
| Example 29 | 1.8 inches | a | 1.1 | 8.0 | 0.52 |
| Example 30 | 1.8 inches | a | 1.1 | 8.0 | 0.52 |
| Example 31 | 1.8 inches | a | 1.1 | 8.0 | 0.52 |
| Example 32 | 1.8 inches | a | 1.1 | 8.0 | 0.52 |
| Example 33 | 1.8 inches | a | 1.1 | 8.0 | 0.52 |
| Example 34 | 1.8 inches | a | 1.1 | 8.0 | 0.62 |
| Example 35 | 1.8 inches | a | 1.1 | 8.0 | 0.45 |

TABLE 1-2

| | Element diameter | Separation membrane Type | Flux (m³/m²/day) | A³/B (×10⁻⁸ m²/sec²/MPa³) | Effective membrane area (m²) |
|---|---|---|---|---|---|
| Example 36 | 1.8 inches | a | 1.1 | 8.0 | 0.52 |
| Example 37 | 2 inches | e | 2.1 | 50 | 0.79 |
| Example 38 | 2 inches | e | 2.1 | 50 | 0.79 |
| Example 39 | 2 inches | e | 2.1 | 50 | 0.79 |
| Example 40 | 2 inches | e | 2.1 | 50 | 0.79 |
| Example 41 | 2 inches | e | 2.1 | 50 | 0.90 |
| Example 42 | 2 inches | e | 2.1 | 50 | 0.67 |
| Example 43 | 2 inches | f | 3.0 | 83 | 0.79 |
| Example 44 | 2 inches | g | 1.8 | 47 | 0.79 |
| Example 45 | 2 inches | h | 1.5 | 28 | 0.79 |
| Example 46 | 2 inches | e | 2.1 | 50 | 0.79 |
| Example 47 | 2 inches | e | 2.1 | 50 | 0.79 |
| Example 48 | 2 inches | e | 2.1 | 50 | 0.79 |
| Example 49 | 2 inches | e | 2.1 | 50 | 0.79 |
| Example 50 | 2 inches | e | 2.1 | 50 | 0.79 |
| Example 51 | 2 inches | e | 2.1 | 50 | 0.79 |
| Example 52 | 1.8 inches | e | 1.1 | 8.0 | 0.52 |
| Example 53 | 1.8 inches | e | 1.1 | 8.0 | 0.52 |
| Example 54 | 1.8 inches | b | 1.5 | 22 | 0.52 |
| Example 55 | 1.8 inches | c | 1.7 | 17 | 0.52 |
| Comp. Ex. 1 | 1.8 inches | a | 1.1 | 8.0 | 0.42 |
| Comp. Ex. 2 | 1.8 inches | a | 1.1 | 8.0 | 0.42 |
| Comp. Ex. 3 | 1.8 inches | a | 1.1 | 8.0 | 0.42 |
| Comp. Ex. 4 | 1.8 inches | a | 1.1 | 8.0 | 0.65 |
| Comp. Ex. 5 | 1.8 inches | a | 1.1 | 8.0 | 0.42 |
| Comp. Ex. 6 | 1.8 inches | a | 1.1 | 8.0 | 0.42 |
| Comp. Ex. 7 | 1.8 inches | a | 1.1 | 8.0 | 0.42 |
| Comp. Ex. 8 | 1.8 inches | a | 1.1 | 8.0 | 0.42 |
| Comp. Ex. 9 | 1.8 inches | a | 1.1 | 8.0 | 0.65 |
| Comp. Ex. 10 | 1.8 inches | a | 1.1 | 8.0 | 0.42 |
| Comp. Ex. 11 | 2 inches | e | 2.1 | 50 | 1.04 |
| Comp. Ex. 12 | 2 inches | e | 2.1 | 50 | 0.65 |
| Comp. Ex. 13 | 1.8 inches | d | 0.75 | 5.4 | 0.52 |

TABLE 2-1

| | Feed-side channel material | | | | | Permeate-side channel material | | |
|---|---|---|---|---|---|---|---|---|
| | Thickness (mm) | Intersection interval (mm) | Intersection density (number per 100 mm²) | Mesh shape | Distance between fibrous materials (mm) | Form | Thickness (mm) | Cross-sectional area ratio |
| Example 1 | 0.30 | 8.0 | 3 | Square | 5.7 | B | 0.30 | 0.43 |
| Example 2 | 0.30 | 10.0 | 2 | Square | 7.1 | B | 0.30 | 0.43 |
| Example 3 | 0.30 | 8.0 | 3 | Square | 5.7 | B | 0.30 | 0.43 |
| Example 4 | 0.30 | 10.0 | 2 | Square | 7.1 | B | 0.30 | 0.43 |
| Example 5 | 0.30 | 8.0 | 3 | Square | 5.7 | B | 0.30 | 0.43 |
| Example 6 | 0.30 | 10.0 | 2 | Square | 7.1 | B | 0.30 | 0.43 |
| Example 7 | 0.30 | 8.0 | 3 | Square | 5.7 | B | 0.30 | 0.43 |
| Example 8 | 0.30 | 10.0 | 2 | Square | 7.1 | B | 0.30 | 0.43 |
| Example 9 | 0.30 | 8.0 | 3 | Square | 5.7 | B | 0.30 | 0.43 |
| Example 10 | 0.30 | 10.0 | 2 | Square | 7.1 | B | 0.30 | 0.43 |
| Example 11 | 0.30 | 8.0 | 3 | Square | 5.7 | B | 0.30 | 0.43 |
| Example 12 | 0.30 | 10.0 | 2 | Square | 7.1 | B | 0.30 | 0.43 |
| Example 13 | 0.30 | 8.0 | 3 | Square | 5.7 | C | 0.30 | 0.56 |
| Example 14 | 0.30 | 8.0 | 3 | Square | 5.7 | C | 0.30 | 0.56 |
| Example 15 | 0.30 | 8.0 | 3 | Square | 5.7 | C | 0.30 | 0.56 |
| Example 16 | 0.15 | 8.0 | 3 | Square | 5.7 | B | 0.30 | 0.43 |
| Example 17 | 0.50 | 8.0 | 3 | Square | 5.7 | B | 0.30 | 0.43 |
| Example 18 | 0.30 | 8.0 | 3 | Square | 5.7 | B | 0.30 | 0.65 |
| Example 19 | 0.30 | 1.4 | 102 | Square | 1.0 | B | 0.30 | 0.43 |
| Example 20 | 0.30 | 1.1 | 165 | Square | 0.8 | B | 0.30 | 0.43 |
| Example 21 | 0.30 | 1.4 | 102 | Square | 1.0 | B | 0.30 | 0.43 |
| Example 22 | 0.30 | 1.1 | 165 | Square | 0.8 | B | 0.30 | 0.43 |
| Example 23 | 0.30 | 1.4 | 102 | Square | 1.0 | B | 0.30 | 0.43 |
| Example 24 | 0.30 | 1.1 | 165 | Square | 0.8 | B | 0.30 | 0.43 |

TABLE 2-1-continued

| | | | | | | | | |
|---|---|---|---|---|---|---|---|---|
| Example 25 | 0.30 | 1.4 | 102 | Square | 1.0 | B | 0.30 | 0.43 |
| Example 26 | 0.30 | 1.1 | 165 | Square | 0.8 | B | 0.30 | 0.43 |
| Example 27 | 0.30 | 1.4 | 102 | Square | 1.0 | B | 0.30 | 0.43 |
| Example 28 | 0.30 | 1.1 | 165 | Square | 0.8 | B | 0.30 | 0.43 |
| Example 29 | 0.30 | 1.4 | 102 | Square | 1.0 | B | 0.30 | 0.43 |
| Example 30 | 0.30 | 1.1 | 165 | Square | 0.8 | B | 0.30 | 0.43 |
| Example 31 | 0.30 | 1.4 | 102 | Square | 1.0 | C | 0.30 | 0.56 |
| Example 32 | 0.30 | 1.4 | 102 | Square | 1.0 | C | 0.30 | 0.56 |
| Example 33 | 0.30 | 1.4 | 102 | Square | 1.0 | C | 0.30 | 0.56 |
| Example 34 | 0.15 | 1.4 | 102 | Square | 1.0 | B | 0.30 | 0.43 |
| Example 35 | 0.50 | 1.4 | 102 | Square | 1.0 | B | 0.30 | 0.43 |

| | Protruding portion of permeate-side channel material | | | Recess portion of permeate-side channel material |
|---|---|---|---|---|
| | Plane shape | Heigh H1 (mm) | Width W (mm) | Groove width D (mm) |
| Example 1 | Straight line (MD) | 0.28 | 0.37 | 0.4 |
| Example 2 | | 0.28 | 0.37 | 0.4 |
| Example 3 | Straight line (MD) | 0.28 | 0.37 | 0.4 |
| Example 4 | Straight line (MD) | 0.28 | 0.37 | 0.4 |
| Example 5 | Straight line (MD) | 0.28 | 0.37 | 0.4 |
| Example 6 | Straight line (MD) | 0.28 | 0.37 | 0.4 |
| Example 7 | Straight line (MD) | 0.28 | 0.37 | 0.4 |
| Example 8 | Straight line (MD) | 0.28 | 0.37 | 0.4 |
| Example 9 | Straight line (MD) | 0.28 | 0.37 | 0.4 |
| Example 10 | Straight line (MD) | 0.28 | 0.37 | 0.4 |
| Example 11 | Straight line (MD) | 0.28 | 0.37 | 0.4 |
| Example 12 | Straight line (MD) | 0.28 | 0.37 | 0.4 |
| Example 13 | Straight line (MD) | 0.23 | 0.37 | 0.6 |
| Example 14 | Straight line (MD) | 0.23 | 0.37 | 0.6 |
| Example 15 | Straight line (MD) | 0.23 | 0.37 | 0.6 |
| Example 16 | Straight line (MD) | 0.28 | 0.37 | 0.4 |
| Example 17 | Straight line (MD) | 0.28 | 0.37 | 0.4 |
| Example 18 | Straight line (MD) | 0.23 | 0.37 | 0.4 |
| Example 19 | Straight line (MD) | 0.28 | 0.37 | 0.4 |
| Example 20 | Straight line (MD) | 0.28 | 0.37 | 0.4 |
| Example 21 | Straight line (MD) | 0.28 | 0.37 | 0.4 |
| Example 22 | Straight line (MD) | 0.28 | 0.37 | 0.4 |
| Example 23 | Straight line (MD) | 0.28 | 0.37 | 0.4 |
| Example 24 | Straight line (MD) | 0.28 | 0.37 | 0.4 |
| Example 25 | Straight line (MD) | 0.28 | 0.37 | 0.4 |
| Example 26 | Straight line (MD) | 0.28 | 0.37 | 0.4 |
| Example 27 | Straight line (MD) | 0.28 | 0.37 | 0.4 |
| Example 28 | Straight line (MD) | 0.28 | 0.37 | 0.4 |
| Example 29 | Straight line (MD) | 0.28 | 0.37 | 0.4 |
| Example 30 | Straight line (MD) | 0.28 | 0.37 | 0.4 |
| Example 31 | Straight line (MD) | 0.23 | 0.37 | 0.6 |
| Example 32 | Straight line (MD) | 0.23 | 0.37 | 0.6 |
| Example 33 | Straight line (MD) | 0.23 | 0.37 | 0.6 |
| Example 34 | Straight line (MD) | 0.28 | 0.37 | 0.4 |
| Example 35 | Straight line (MD) | 0.28 | 0.37 | 0.4 |

TABLE 2-2

| | Feed-side channel material | | | | Distance | Permeate-side channel material | | |
|---|---|---|---|---|---|---|---|---|
| | | Intersection | | | | | | |
| | Thickness (mm) | Intersection interval (mm) | density (number per 100 mm$^2$) | Mesh shape | between fibrous materials (mm) | Form | Thickness (mm) | Cross-sectional area ratio |
| Example 36 | 0.30 | 1.4 | 102 | Square | 1.0 | B | 0.30 | 0.65 |
| Example 37 | 0.30 | 1.7 | 71 | Square | 1.2 | A | 0.26 | 0.83 |
| Example 38 | 0.30 | 2.5 | 32 | Square | 2.0 | A | 0.26 | 0.83 |
| Example 39 | 0.30 | 1.2 | 133 | Square | 0.8 | A | 0.26 | 0.83 |
| Example 40 | 0.30 | 1.5 | 94 | Square | 1.0 | A | 0.26 | 0.83 |
| Example 41 | 0.20 | 1.0 | 205 | Square | 0.6 | A | 0.26 | 0.83 |
| Example 42 | 0.45 | 3.4 | 17 | Square | 3.0 | A | 0.26 | 0.83 |
| Example 43 | 0.30 | 1.7 | 71 | Square | 1.2 | A | 0.26 | 0.83 |
| Example 44 | 0.30 | 1.7 | 71 | Square | 1.2 | A | 0.26 | 0.83 |
| Example 45 | 0.30 | 1.7 | 71 | Square | 1.2 | A | 0.26 | 0.83 |
| Example 46 | 0.30 | 1.7 | 71 | Square | 1.2 | B | 0.30 | 0.43 |

TABLE 2-2-continued

| | | | | | | | | |
|---|---|---|---|---|---|---|---|---|
| Example 47 | 0.30 | 1.7 | 71 | Square | 1.2 | B | 0.30 | 0.65 |
| Example 48 | 0.30 | 1.7 | 71 | Square | 1.2 | C | 0.30 | 0.56 |
| Example 49 | 0.30 | 1.7 | 71 | Square | 3.0 | A | 0.26 | 0.83 |
| Example 50 | 0.30 | 1.7 | 71 | Square | 3.0 | A | 0.26 | 0.83 |
| Example 51 | 0.30 | 1.7 | 71 | Square | 3.0 | A | 0.26 | 0.83 |
| Example 52 | 0.30 | 0.5 | 800 | Square | 0.4 | A | 0.26 | 0.83 |
| Example 53 | 0.30 | 0.8 | 313 | Square | 0.6 | A | 0.26 | 0.83 |
| Example 54 | 0.30 | 0.8 | 313 | Square | 0.6 | A | 0.26 | 0.83 |
| Example 55 | 0.30 | 0.8 | 313 | Square | 0.6 | B | 0.30 | 0.43 |
| Comparative Example 1 | 0.60 | 8.0 | 3 | Square | 5.7 | B | 0.30 | 0.43 |
| Comparative Example 2 | 0.60 | 8.0 | 3 | Square | 5.7 | B | 0.30 | 0.43 |
| Comparative Example 3 | 0.60 | 8.0 | 3 | Square | 5.7 | B | 0.30 | 0.43 |
| Comparative Example 4 | 0.10 | 8.0 | 3 | Square | 5.7 | B | 0.30 | 0.43 |
| Comparative Example 5 | 0.60 | 8.0 | 3 | Square | 5.7 | B | 0.30 | 0.43 |
| Comparative Example 6 | 0.60 | 1.4 | 102 | Square | 1.0 | B | 0.30 | 0.43 |
| Comparative Example 7 | 0.60 | 1.4 | 102 | Square | 1.0 | B | 0.30 | 0.43 |
| Comparative Example 8 | 0.60 | 1.4 | 102 | Square | 1.0 | B | 0.30 | 0.43 |
| Comparative Example 9 | 0.10 | 1.4 | 102 | Square | 1.0 | B | 0.30 | 0.43 |
| Comparative Example 10 | 0.60 | 1.4 | 102 | Square | 1.0 | B | 0.30 | 0.43 |
| Comparative Example 11 | 0.10 | 1.7 | 71 | Square | 1.2 | A | 0.26 | 0.83 |
| Comparative Example 12 | 0.55 | 4.7 | 9 | Square | 1.2 | A | 0.26 | 0.83 |
| Comparative Example 13 | 0.30 | 1.1 | 165 | Square | 0.8 | A | 0.26 | 0.83 |

| | Protruding portion of permeate-side channel material | | | Recess portion of permeate-side channel material |
|---|---|---|---|---|
| | Plane shape | Heigh HI (mm) | Width W (mm) | Groove width D (mm) |
| Example 36 | Straight line (MD) | 0.23 | 0.37 | 0.4 |
| Example 37 | — | — | — | — |
| Example 38 | — | — | — | — |
| Example 39 | — | — | — | — |
| Example 40 | — | — | — | — |
| Example 41 | — | — | — | — |
| Example 42 | — | — | — | — |
| Example 43 | — | — | — | — |
| Example 44 | — | — | — | — |
| Example 45 | — | — | — | — |
| Example 46 | Straight line (MD) | 0.28 | 0.37 | 0.4 |
| Example 47 | Straight line (MD) | 0.23 | 0.37 | 0.4 |
| Example 48 | Straight line (MD) | 0.23 | 0.37 | 0.6 |
| Example 49 | — | — | — | — |
| Example 50 | — | — | — | — |
| Example 51 | — | — | — | — |
| Example 52 | — | — | — | — |
| Example 53 | — | — | — | — |
| Example 54 | — | — | — | — |
| Example 55 | Straight line (MD) | 0.28 | 0.37 | 0.4 |
| Comparative Example 1 | Straight line (MD) | 0.28 | 0.37 | 0.4 |
| Comparative Example 2 | Straight line (MD) | 0.28 | 0.37 | 0.4 |
| Comparative Example 3 | Straight line (MD) | 0.28 | 0.37 | 0.4 |
| Comparative Example 4 | Straight line (MD) | 0.28 | 0.37 | 0.4 |
| Comparative Example 5 | Straight line (MD) | 0.28 | 0.37 | 0.4 |
| Comparative Example 6 | Straight line (MD) | 0.28 | 0.37 | 0.4 |
| Comparative Example 7 | Straight line (MD) | 0.28 | 0.37 | 0.4 |
| Comparative Example 8 | Straight line (MD) | 0.28 | 0.37 | 0.4 |

TABLE 2-2-continued

| | | | | |
|---|---|---|---|---|
| Comparative Example 9 | Straight line (MD) | 0.23 | 0.37 | 0.4 |
| Comparative Example 10 | Straight line (MD) | 0.28 | 0.37 | 0.4 |
| Comparative Example 11 | — | — | — | — |
| Comparative Example 12 | — | — | — | — |
| Comparative Example 13 | — | — | — | — |

TABLE 3-1

| | Position of raw water feed portion | Recovery ratio (%) | (Condition 1) element performance | | (Condition 2) element performance (after 30 minutes of operation) | | (Condition 2) element performance (after production of 3000 L) | |
|---|---|---|---|---|---|---|---|---|
| | | | Fresh water production rate (GPD) | Desalination ratio (%) | Fresh water production rate (m³/day) | Desalination ratio (%) | Fresh water production rate (m³/day) | Desalination ratio (%) |
| Example 1 | Outer periphery | 60 | 79 | 98.4 | 0.27 | 97.6 | 0.23 | 97.5 |
| Example 2 | Outer periphery | 60 | 82 | 98.5 | 0.28 | 97.7 | 0.24 | 97.6 |
| Example 3 | Outer periphery and First end face | 60 | 76 | 98.3 | 0.26 | 97.5 | 0.22 | 97.4 |
| Example 4 | Outer periphery and First end face | 60 | 85 | 98.4 | 0.29 | 97.6 | 0.25 | 97.5 |
| Example 5 | First end face | 60 | 120 | 96.2 | 0.41 | 95.4 | 0.34 | 95.0 |
| Example 6 | First end face | 60 | 126 | 96.5 | 0.43 | 95.7 | 0.36 | 95.4 |
| Example 7 | Outer periphery | 40 | 94 | 99.2 | 0.32 | 98.4 | 0.30 | 98.5 |
| Example 8 | Outer periphery | 40 | 97 | 99.4 | 0.33 | 98.6 | 0.32 | 98.7 |
| Example 9 | Outer periphery and First end face | 40 | 88 | 99.0 | 0.30 | 98.2 | 0.27 | 98.2 |
| Example 10 | Outer periphery and First end face | 40 | 97 | 99.1 | 0.33 | 98.3 | 0.31 | 98.4 |
| Example 11 | First end face | 40 | 132 | 97.3 | 0.45 | 96.5 | 0.39 | 97.0 |
| Example 12 | First end face | 40 | 135 | 97.5 | 0.46 | 96.7 | 0.39 | 96.9 |
| Example 13 | Outer periphrey | 60 | 82 | 98.3 | 0.28 | 97.5 | 0.23 | 97.6 |
| Example 14 | Outer periphery and First end face | 60 | 79 | 98.1 | 0.27 | 97.3 | 0.23 | 97.4 |
| Example 15 | First end face | 60 | 117 | 96.3 | 0.40 | 95.5 | 0.33 | 95.1 |
| Example 16 | Outer periphery | 60 | 76 | 98.6 | 0.26 | 97.8 | 0.23 | 97.6 |
| Example 17 | Outer periphery | 60 | 68 | 98.2 | 0.23 | 97.4 | 0.21 | 97.3 |
| Example 18 | Outer periphery | 60 | 68 | 98.4 | 0.23 | 97.6 | 0.20 | 97.7 |
| Example 19 | Outer periphery | 60 | 116 | 99.0 | 0.39 | 97.6 | 0.34 | 98.4 |
| Example 20 | Outer periphery | 60 | 106 | 99.3 | 0.36 | 98.1 | 0.33 | 98.5 |
| Example 21 | Outer periphery and First end face | 60 | 119 | 99.1 | 0.41 | 97.9 | 0.36 | 98.6 |

TABLE 3-1-continued

| | | | | | | | | |
|---|---|---|---|---|---|---|---|---|
| Example 22 | Outer periphery and First end face | 60 | 106 | 99.5 | 0.36 | 98.3 | 0.33 | 98.7 |
| Example 23 | First end face | 60 | 132 | 97.2 | 0.45 | 96.0 | 0.35 | 97.2 |
| Example 24 | First end face | 60 | 125 | 97.3 | 0.43 | 96.1 | 0.35 | 97.4 |
| Example 25 | Outer periphery | 40 | 125 | 99.4 | 0.43 | 98.2 | 0.37 | 98.9 |
| Example 26 | Outer periphery | 40 | 112 | 99.5 | 0.38 | 98.3 | 0.33 | 98.8 |
| Example 27 | Outer periphery and First end face | 40 | 132 | 99.5 | 0.45 | 98.3 | 0.39 | 98.8 |
| Example 28 | Outer periphery and First end face | 40 | 122 | 99.8 | 0.42 | 98.6 | 0.35 | 98.6 |
| Example 29 | First end face | 40 | 142 | 98.2 | 0.48 | 97.0 | 0.37 | 97.6 |
| Example 30 | First end face | 40 | 139 | 98.0 | 0.47 | 96.8 | 0.37 | 97.5 |
| Example 31 | Outer periphery | 60 | 109 | 99.2 | 0.37 | 98.0 | 0.30 | 98.6 |
| Example 32 | Outer periphery and First end face | 60 | 99 | 99.4 | 0.34 | 98.2 | 0.28 | 98.7 |
| Example 33 | First end face | 60 | 125 | 97.1 | 0.43 | 95.9 | 0.34 | 97.0 |
| Example 34 | Outer periphery | 60 | 99 | 98.2 | 0.34 | 97.0 | 0.29 | 97.6 |
| Example 35 | Outer periphery | 60 | 99 | 98.3 | 0.34 | 97.6 | 0.26 | 98.0 |

| | (Condition 3) element performance (after 30 minutes of operation) | | (Condition 3) element performance (after production of 3000 L) | | Adhered amount of inorganic scale (g/m$^2$) | Adhered amount of organic fouling (g/m$^2$) | Total amount of adhered substances (g/m$^2$) |
|---|---|---|---|---|---|---|---|
| | Fresh water production rate (m$^3$/day) | Desalination ratio (%) | Fresh water production rate (m$^3$/day) | Desalination ratio (%) | | | |
| Example 1 | 0.24 | 95.8 | 0.20 | 95.7 | 0.06 | 0.17 | 0.23 |
| Example 2 | 0.25 | 95.9 | 0.21 | 95.8 | 0.05 | 0.16 | 0.21 |
| Example 3 | 0.23 | 95.7 | 0.20 | 95.6 | 0.04 | 0.19 | 0.23 |
| Example 4 | 0.26 | 95.8 | 0.22 | 95.7 | 0.05 | 0.19 | 0.24 |
| Example 5 | 0.36 | 93.6 | 0.30 | 93.2 | 0.03 | 0.23 | 0.26 |
| Example 6 | 0.38 | 93.9 | 0.32 | 93.6 | 0.04 | 0.22 | 0.26 |
| Example 7 | 0.28 | 96.6 | 0.27 | 96.7 | 0.02 | 0.15 | 0.17 |
| Example 8 | 0.29 | 96.8 | 0.28 | 96.9 | 0.06 | 0.10 | 0.16 |
| Example 9 | 0.27 | 96.4 | 0.24 | 96.4 | 0.04 | 0.13 | 0.17 |
| Example 10 | 0.29 | 96.5 | 0.28 | 96.6 | 0.03 | 0.16 | 0.19 |
| Example 11 | 0.40 | 94.7 | 0.35 | 95.2 | 0.05 | 0.16 | 0.21 |
| Example 12 | 0.41 | 94.9 | 0.35 | 95.1 | 0.03 | 0.18 | 0.21 |
| Example 13 | 0.25 | 95.7 | 0.20 | 95.8 | 0.05 | 0.13 | 0.18 |
| Example 14 | 0.24 | 95.5 | 0.20 | 95.6 | 0.04 | 0.19 | 0.23 |
| Example 15 | 0.36 | 93.7 | 0.29 | 93.3 | 0.06 | 0.20 | 0.26 |
| Example 16 | 0.23 | 96.0 | 0.20 | 95.8 | 0.05 | 0.19 | 0.24 |
| Example 17 | 0.20 | 95.6 | 0.19 | 95.5 | 0.04 | 0.21 | 0.25 |
| Example 18 | 0.20 | 95.8 | 0.18 | 95.9 | 0.05 | 0.22 | 0.27 |
| Example 19 | 0.35 | 97.2 | 0.30 | 97.8 | 0.12 | 0.08 | 0.20 |
| Example 20 | 0.32 | 97.5 | 0.29 | 97.9 | 0.09 | 0.08 | 0.17 |
| Example 21 | 0.36 | 97.3 | 0.32 | 98.0 | 0.10 | 0.08 | 0.18 |
| Example 22 | 0.32 | 97.7 | 0.29 | 98.1 | 0.08 | 0.07 | 0.15 |
| Example 23 | 0.40 | 95.4 | 0.31 | 96.6 | 0.14 | 0.11 | 0.25 |
| Example 24 | 0.38 | 95.5 | 0.31 | 96.8 | 0.13 | 0.10 | 0.23 |
| Example 25 | 0.38 | 97.6 | 0.33 | 98.3 | 0.12 | 0.07 | 0.19 |
| Example 26 | 0.34 | 97.7 | 0.29 | 98.2 | 0.08 | 0.07 | 0.15 |
| Example 27 | 0.40 | 97.7 | 0.35 | 98.2 | 0.07 | 0.08 | 0.15 |
| Example 28 | 0.37 | 98.0 | 0.31 | 98.0 | 0.07 | 0.06 | 0.13 |
| Example 29 | 0.43 | 96.4 | 0.33 | 97.0 | 0.11 | 0.11 | 0.22 |
| Example 30 | 0.42 | 96.2 | 0.33 | 96.9 | 0.12 | 0.08 | 0.20 |
| Example 31 | 0.33 | 97.4 | 0.27 | 98.0 | 0.09 | 0.07 | 0.16 |
| Example 32 | 0.30 | 97.6 | 0.25 | 98.1 | 0.08 | 0.07 | 0.15 |

TABLE 3-1-continued

|  | | | | | | |
|---|---|---|---|---|---|---|
| Example 33 | 0.38 | 95.3 | 0.30 | 96.4 | 0.14 | 0.06 | 0.20 |
| Example 34 | 0.30 | 96.4 | 0.26 | 97.0 | 0.18 | 0.08 | 0.26 |
| Example 35 | 0.30 | 97.0 | 0.23 | 97.4 | 0.15 | 0.13 | 0.28 |

TABLE 3-2

|  | Position of raw water feed portion | Recovery ratio (%) | (Condition 1) element performance | | (Condition 2) element performance (after 30 minutes of operation) | | (Condition 2) element performance (after production of 3000 L) | |
|---|---|---|---|---|---|---|---|---|
|  |  |  | Fresh water production rate (GPD) | Desalination ratio (%) | Fresh water production rate (m³/day) | Desalination ratio (%) | Fresh water production rate (m³/day) | Desalination ratio (%) |
| Example 36 | Outer periphery | 60 | 99 | 98.7 | 0.34 | 97.5 | 0.29 | 98.3 |
| Example 37 | First end face | 15 | 289 | 97.9 | 0.98 | 97.1 | 0.79 | 97.7 |
| Example 38 | First end face | 15 | 289 | 97.9 | 0.98 | 97.1 | 0.79 | 97.7 |
| Example 39 | First end face | 15 | 289 | 97.9 | 0.98 | 97.1 | 0.79 | 97.7 |
| Example 40 | First end face | 15 | 289 | 97.9 | 0.98 | 97.1 | 0.79 | 97.7 |
| Example 41 | First end face | 15 | 300 | 97.9 | 1.02 | 97.1 | 0.82 | 97.7 |
| Example 42 | First end face | 15 | 267 | 97.9 | 0.91 | 97.1 | 0.73 | 97.7 |
| Example 43 | First end face | 15 | 334 | 97.5 | 1.14 | 96.7 | 0.91 | 97.3 |
| Example 44 | First end face | 15 | 265 | 98.4 | 0.90 | 97.6 | 0.72 | 98.2 |
| Example 45 | First end face | 15 | 236 | 98.2 | 0.80 | 97.4 | 0.64 | 98.0 |
| Example 46 | First end face | 15 | 328 | 97.9 | 1.12 | 97.1 | 0.90 | 97.7 |
| Example 47 | First end face | 15 | 330 | 97.9 | 1.12 | 97.1 | 0.90 | 97.7 |
| Example 48 | First end face | 15 | 341 | 97.9 | 1.16 | 97.1 | 0.93 | 97.7 |
| Example 49 | Outer periphery | 15 | 201 | 97.9 | 0.68 | 97.1 | 0.55 | 97.7 |
| Example 50 | Outer periphery and First end face | 15 | 210 | 97.9 | 0.72 | 97.1 | 0.57 | 97.7 |
| Example 51 | First end face | 40 | 318 | 97.5 | 1.08 | 96.7 | 0.87 | 97.3 |
| Example 52 | First end face | 60 | 130 | 97.5 | 0.44 | 96.7 | 0.35 | 97.3 |
| Example 53 | First end face | 60 | 128 | 97.3 | 0.44 | 96.5 | 0.35 | 97.1 |
| Example 54 | First end face | 60 | 196 | 98.8 | 0.67 | 98.0 | 0.53 | 98.6 |
| Example 55 | First end face | 60 | 215 | 97.5 | 0.73 | 96.7 | 0.59 | 97.3 |
| Comparative Example 1 | Outer periphery | 60 | 85 | 97.2 | 0.29 | 96.4 | 0.21 | 94.0 |
| Comparative Example 2 | Outer periphery and First end face | 60 | 88 | 97.2 | 0.30 | 96.4 | 0.21 | 93.9 |
| Comparative Example 3 | First end face | 60 | 114 | 95.2 | 0.39 | 94.4 | 0.20 | 90.0 |
| Comparative Example 4 | Outer periphery | 60 | 35 | 93.9 | 0.12 | 93.1 | 0.05 | 89.4 |
| Comparative Example 5 | Outer periphery | 40 | 103 | 97.5 | 0.35 | 96.7 | 0.30 | 95.8 |
| Comparative Example 6 | Outer periphery | 60 | 79 | 98.0 | 0.27 | 97.2 | 0.20 | 97.3 |
| Comparative Example 7 | Outer periphery and First end face | 60 | 86 | 98.2 | 0.29 | 97.4 | 0.21 | 98.0 |

TABLE 3-2-continued

| | | | | | | | | |
|---|---|---|---|---|---|---|---|---|
| Comparative Example 8 | First end face | 60 | 112 | 97.4 | 0.36 | 96.6 | 0.27 | 97.1 |
| Comparative Example 9 | Outer periphery | 60 | 43 | 93.6 | 0.15 | 92.8 | 0.09 | 94.5 |
| Comparative Example 10 | Outer periphery | 40 | 89 | 98.8 | 0.30 | 98.0 | 0.23 | 98.2 |
| Comparative Example 11 | First end face | 15 | 80 | 97.9 | 0.27 | 96.7 | 0.22 | 97.3 |
| Comparative Example 12 | First end face | 15 | 140 | 97.9 | 0.48 | 96.7 | 0.38 | 97.3 |
| Comparative Example 13 | First end face | 60 | 95 | 93.4 | 0.32 | 92.2 | 0.26 | 92.8 |

| | (Condition 3) element performance (after 30 minutes of operation) | | (Condition 3) element performance (after production of 3000 L) | | Adhered amount of inorganic scale (g/m²) | Adhered amount of organic fouling (g/m²) | Total amount of adhered substances (g/m²) |
|---|---|---|---|---|---|---|---|
| | Fresh water production rate (m³/day) | Desalination ratio (%) | Fresh water production rate (m³/day) | Desalination ratio (%) | | | |
| Example 36 | 0.30 | 96.9 | 0.26 | 97.7 | 0.12 | 0.07 | 0.19 |
| Example 37 | 0.87 | 95.5 | 0.67 | 96.0 | 0.10 | 0.30 | 0.40 |
| Example 38 | 0.87 | 95.5 | 0.67 | 96.0 | 0.07 | 0.30 | 0.37 |
| Example 39 | 0.87 | 95.5 | 0.67 | 90.0 | 0.06 | 0.29 | 0.35 |
| Example 40 | 0.87 | 95.5 | 0.67 | 96.0 | 0.09 | 0.27 | 0.36 |
| Example 41 | 0.91 | 95.5 | 0.70 | 96.0 | 0.13 | 0.32 | 0.45 |
| Example 42 | 0.81 | 95.5 | 0.62 | 96.0 | 0.06 | 0.36 | 0.42 |
| Example 43 | 1.01 | 95.1 | 0.78 | 95.6 | 0.11 | 0.30 | 0.41 |
| Example 44 | 0.80 | 96.0 | 0.62 | 96.5 | 0.09 | 0.29 | 0.38 |
| Example 45 | 0.71 | 95.8 | 0.55 | 96.3 | 0.08 | 0.31 | 0.39 |
| Example 46 | 0.99 | 95.5 | 0.77 | 96.0 | 0.10 | 0.33 | 0.43 |
| Example 47 | 1.00 | 95.5 | 0.77 | 96.0 | 0.14 | 0.30 | 0.44 |
| Example 48 | 1.03 | 95.5 | 0.80 | 96.0 | 0.13 | 0.25 | 0.38 |
| Example 49 | 0.61 | 95.5 | 0.47 | 96.0 | 0.08 | 0.24 | 0.32 |
| Example 50 | 0.64 | 95.5 | 0.49 | 96.0 | 0.12 | 0.22 | 0.34 |
| Example 51 | 0.96 | 95.1 | 0.74 | 95.6 | 0.10 | 0.39 | 0.49 |
| Example 52 | 0.39 | 95.1 | 0.30 | 95.6 | 0.16 | 0.08 | 0.24 |
| Example 53 | 0.39 | 94.9 | 0.30 | 95.4 | 0.15 | 0.07 | 0.22 |
| Example 54 | 0.59 | 96.4 | 0.46 | 96.9 | 0.28 | 0.23 | 0.51 |
| Example 55 | 0.65 | 95.1 | 0.50 | 95.6 | 0.31 | 0.25 | 0.56 |
| Comparative Example 1 | 0.26 | 94.6 | 0.19 | 92.2 | 0.13 | 0.33 | 0.46 |
| Comparative Example 2 | 0.27 | 94.6 | 0.19 | 92.1 | 0.16 | 0.34 | 0.50 |
| Comparative Example 3 | 0.35 | 92.6 | 0.18 | 88.2 | 0.20 | 0.34 | 0.54 |
| Comparative Example 4 | 0.11 | 91.3 | 0.04 | 87.6 | 0.08 | 0.15 | 0.23 |
| Comparative Example 5 | 0.31 | 94.9 | 0.27 | 94.0 | 0.09 | 0.23 | 0.32 |
| Comparative Example 6 | 0.24 | 96.2 | 0.18 | 96.3 | 0.17 | 0.18 | 0.35 |
| Comparative Example 7 | 0.26 | 96.4 | 0.19 | 97.0 | 0.16 | 0.17 | 0.33 |
| Comparative Example 8 | 0.34 | 95.6 | 0.24 | 96.1 | 0.20 | 0.21 | 0.41 |
| Comparative Example 9 | 0.13 | 91.8 | 0.08 | 93.5 | 0.09 | 0.12 | 0.21 |
| Comparative Example 10 | 0.27 | 97.0 | 0.20 | 97.2 | 0.14 | 0.16 | 0.30 |
| Comparative Example 11 | 0.24 | 95.1 | 0.19 | 95.6 | 0.03 | 0.29 | 0.32 |
| Comparative Example 12 | 0.42 | 95.1 | 0.33 | 95.6 | 0.12 | 0.57 | 0.69 |
| Comparative Example 13 | 0.29 | 90.6 | 0.22 | 91.1 | 0.11 | 0.12 | 0.23 |

Examples 2 to 55

As shown in Tables 1 to 3, the separation membrane elements were prepared by changing the separation membrane element diameter, the separation membrane, the feed-side channel material, the permeate-side channel material, the position of the raw water feed portion, and the recovery ratio.

Each of the separation membrane elements was placed in a pressure vessel and the performances thereof were evaluated wider the same conditions as in Example 1. The results were shown in Table 3.

Comparative Examples 1 to 13

As shown in Tables 1 to 3, the separation membrane elements were prepared by changing the separation membrane element diameter, the separation membrane, the feed-side channel material, the permeate-side channel material, the position of the raw water feed portion, and the recovery ratio.

Each of the separation membrane elements was placed in a pressure vessel and the performances thereof were evaluated under the same conditions as in Example 1. The results were shown in Table 3.

DESCRIPTION OF REFERENCE NUMERALS AND SIGNS

1: Feed-side channel material
11: Fibrous material A
12: Fibrous material B
101: Feed water
102: Permeate
103: Concentrate
2: Separation membrane
3: Permeate-side channel material
4: Water collection tube
5, 5B, 5C: Separation membrane element
6: Protruding portion
7: Recess portion
82: Porous member
821: Pore
91: End plate without holes
92, 93, 94: End plate with holes
a, h: Intersection interval of fibrous material
c. d: Constituent fiber diameter of fibrous material
e, f: Tilt angle of fibrous material of feed-side channel material
D: Groove width
E: Groove length
H0: Thickness of permeate-side channel material
H1: Height of protruding portion of permeate-side channel material
S, S1, S2: Cross-sectional area of protruding portion of permeate-side channel material.
P: Distance between center of protruding portion and center of another protruding portion adjacent thereto of permeate-side channel material
W: Width of protruding portion of permeate-side channel material
X: Length of protruding portion of permeate-side channel material

The invention claimed is:

1. A separation membrane element comprising:
a water collection tube;
a separation membrane having a feed-side face and a permeate-side face;
a feed-side channel material; and
a permeate-side channel material,
wherein:
the separation membrane, the feed-side channel material and the permeate-side channel material are spirally wound around the water collection tube,
the feed-side channel material comprises a plurality of fibrous materials crossing each other,
the feed-side channel material has a thickness of 0.15 mm to 0.50 mm,
where an aqueous sodium chloride solution having a concentration of 200 ppm and a pH of 6.5 is used as feed water, and filtration is performed under conditions of an operation pressure of 0.41 MPa and a temperature of 25° C., the separation membrane has a value of $A^3/B$ $(m^2/sec^2/MPa^3)$ of $8.0 \times 10^{-8}$ or more, in which A (m/sec/MPa) is a solution permeation coefficient and B (m/sec) is a solute permeation coefficient, and has a flux of 1.1 m/day or more and 3.0 or less, and
the feed-side channel material has an intersection interval of 0.5 mm to 1.4 mm.

2. The separation membrane element according to claim 1, wherein, where an aqueous sodium chloride solution having a concentration of 200 ppm and a pH of 6.5 is used as feed water, and filtration is performed under conditions of an operation pressure of 0.41 MPa and a temperature of 25° C., a flux amount is 1.5 m/day or more and 3.0 m/day or less.

3. The separation membrane element according to claim 1, wherein the feed-side channel material has an intersection density of 3 or less per 100 $mm^2$.

4. The separation membrane element according to claim 1, wherein the feed-side channel material has an intersection density of 15 to 210 per 100 $mm^2$.

5. The separation membrane element according to claim 1, wherein a feed-side flow channel formed by the feed-side channel material is formed in a direction perpendicular to a longitudinal direction of the water collection tube.

6. The separation membrane element according to claim 1, wherein the permeate-side channel material is a sheet on which a plurality of projections are formed or a sheet on which a plurality of projections are fixed.

7. The separation membrane element according to claim 6, wherein the projections are formed or fixed in the direction perpendicular to the longitudinal direction of the water collection tube.

8. The separation membrane element according to claim 1, wherein a cross section of the permeate-side channel material forms a plurality of permeate-side flow channels, and a cross-sectional area ratio of the permeate-side channel material is 0.4 to 0.75.

* * * * *